US009019894B2

(12) United States Patent
Aramoto et al.

(10) Patent No.: US 9,019,894 B2
(45) Date of Patent: Apr. 28, 2015

(54) POSITION MANAGING APPARATUS, PACKET GATEWAY APPARATUS, MOBILE COMMUNICATION SYSTEM, MOBILE STATION APPARATUS AND MOBILE COMMUNICATION METHOD

(75) Inventors: Masafumi Aramoto, Osaka (JP); Hirokazu Naoe, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 80 days.

(21) Appl. No.: 13/640,828

(22) PCT Filed: Apr. 8, 2011

(86) PCT No.: PCT/JP2011/058887
§ 371 (c)(1),
(2), (4) Date: Oct. 12, 2012

(87) PCT Pub. No.: WO2011/129273
PCT Pub. Date: Oct. 20, 2011

(65) Prior Publication Data
US 2013/0034057 A1     Feb. 7, 2013

(30) Foreign Application Priority Data

Apr. 14, 2010   (JP) ................................ 2010-093266

(51) Int. Cl.
| | |
|---|---|
| H04W 4/00 | (2009.01) |
| H04W 36/00 | (2009.01) |
| H04W 84/04 | (2009.01) |
| H04W 8/08 | (2009.01) |

(52) U.S. Cl.
CPC ........ *H04W 36/0011* (2013.01); *H04W 84/045* (2013.01); *H04W 8/082* (2013.01)

(58) Field of Classification Search
USPC .......... 370/328–339, 400–401; 455/436–444
See application file for complete search history.

(56) References Cited

U.S. PATENT DOCUMENTS

| | | | |
|---|---|---|---|
| 2010/0278108 A1* | 11/2010 | Cho et al. ....................... | 370/328 |
| 2012/0039213 A1* | 2/2012 | Cheng et al. ................... | 370/254 |
| 2012/0046058 A1* | 2/2012 | Vesterinen et al. ........... | 455/509 |

FOREIGN PATENT DOCUMENTS

JP     2007-274657 A     10/2007

OTHER PUBLICATIONS

3GPP TR23.829 Local IP Access and Selected IP Traffic Offload V1.0.1. (Mar. 2010), pp. 1-37.
3GPP TSG SA WG2 Meeting #78, S2-101361, Feb. 22-26, 2010, pp. 1-12.

* cited by examiner

*Primary Examiner* — Frank Duong
(74) *Attorney, Agent, or Firm* — Birch, Stewart, Kolasch & Birch, LLP

(57) ABSTRACT

When a connecting destination base station apparatus included in a message including an identifier of a base station apparatus serving as a connecting destination of a mobile station apparatus is different from a connecting source base station apparatus stored in an EPS bearer context, rearrangement of local PDN connection is requested to an L-PGW unit of the connecting destination base station apparatus and local PDN connection is deleted. After establishment of a wireless bearer is completed between the mobile station apparatus and the connecting destination base station apparatus, the connecting destination base station apparatus is instructed to start proxy transmission of neighbor advertisement instead of the mobile station apparatus. In base stations that support local IP access, when UE performs service request processing or handover processing between home base stations, it is possible to continue communication session using local IP access while suppressing alterations to existing system to the minimum.

4 Claims, 28 Drawing Sheets

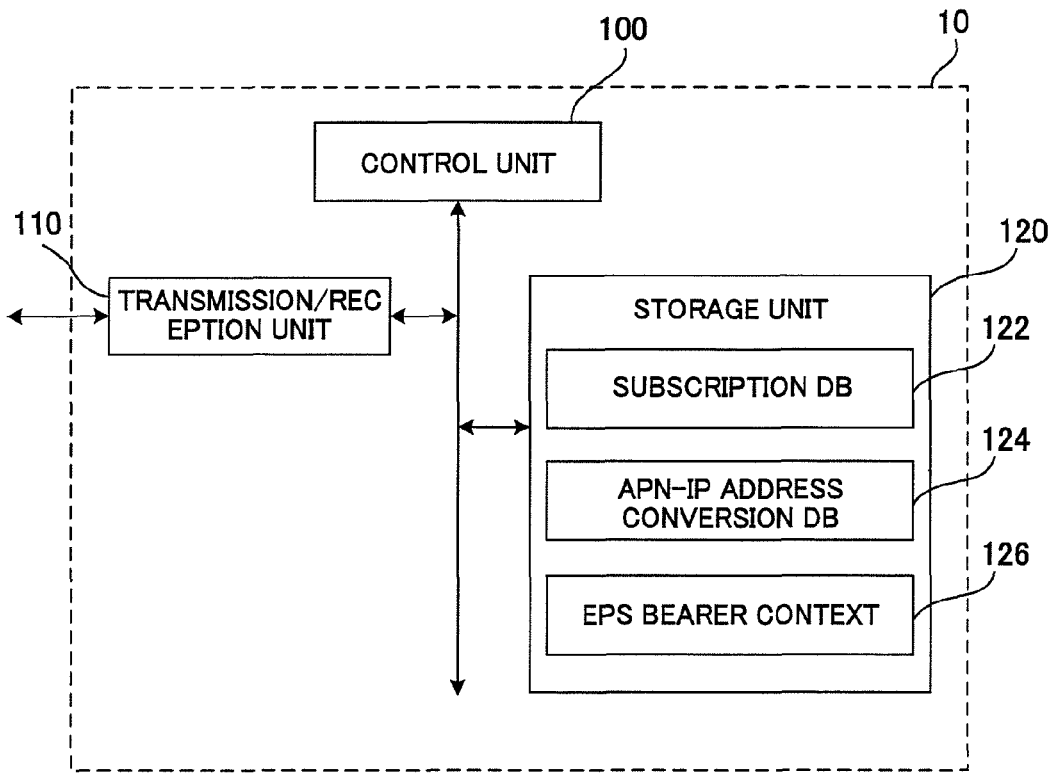

FIG. 4(a)

| APN | GLOBAL eNB IDENTIFIER | PGW ADDRESS |
|---|---|---|
| LIPA | HeNB1 | 2001:100:200:300::2 |

FIG. 4(b)

| APN | GLOBAL ENB IDENTIFIER | PGW ADDRESS |
|---|---|---|
| LIPA | HeNB1 | 2001:100:200:300::2 |
| LIPA | HeNB2 | 2001:100:200:300::3 |

FIG. 5(a)

| UE IDENTIFIER | UE1 |
|---|---|
| APN | LIPA |
| HoA | 2001:100:200:300::5 |
| PGW ADDRESS | 2001:100:200:300::2 |
| SGW ADDRESS | 2001:1::2 |
| ENB ADDRESS | N/A |
| S1-TEID | N/A |
| CELL ID | ECGI1 |
| EPS BEARER ID | EPS BEARER 1 |

FIG. 5(b)

| UE IDENTIFIER | UE1 |
|---|---|
| APN | LIPA |
| HoA | 2001:100:200:300::5 |
| PGW ADDRESS | 2001:100:200:300::2 |
| SGW ADDRESS | 2001:1::2 |
| ENB ADDRESS | 2001:100:200:300::2 |
| S1-TEID | TEID1 |
| CELL ID | ECGI1 |
| EPS BEARER ID | EPS BEARER 1 |

FIG. 5(c)

| UE IDENTIFIER | UE1 |
|---|---|
| APN | LIPA |
| HoA | 2001:100:200:300::5 |
| PGW ADDRESS | OLD 2001:100:200:300::2 |
| | NEW 2001:100:200:300::3 |
| SGW ADDRESS | 2001:1::2 |
| ENB ADDRESS | N/A |
| S1-TEID | N/A |
| CELL ID | N/A |
| EPS BEARER ID | EPS BEARER 1 |

FIG. 5(d)

| UE IDENTIFIER | UE1 |
|---|---|
| APN | LIPA |
| HoA | 2001:100:200:300::5 |
| PGW ADDRESS | 2001:100:200:300::3 |
| SGW ADDRESS | 2001:1::2 |
| ENB ADDRESS | 2001:100:200:300::3 |
| S1-TEID | TEID2 |
| CELL ID | ECGI2 |
| EPS BEARER ID | EPS BEARER 1 |

FIG. 6

| | |
|---|---|
| UE IDENTIFIER | UE1 |
| APN | LIPA |
| HoA | 2001:100:200:300::5 |
| PGW ADDRESS | 2001:100:200:300::2 |
| SGW ADDRESS | 2001:1::2 |
| ENB ADDRESS | N/A |
| S1-TEID | N/A |
| CELL ID | N/A |
| EPS BEARER ID | EPS BEARER 1 |

FIG. 8(a)

| UE IDENTIFIER | UE1 |
|---|---|
| APN | LIPA |
| PGW ADDRESS | 2001:100:200:300: :2 |
| ENB ADDRESS | N/A |
| S1-TEID | N/A |
| EPS BEARER ID | EPS BEARER 1 |

FIG. 8(b)

| UE IDENTIFIER | UE1 |
|---|---|
| APN | LIPA |
| PGW ADDRESS | 2001:100:200:300: :2 |
| ENB ADDRESS | 2001:100:200:300: :2 |
| S1-TEID | TEID1 |
| EPS BEARER ID | EPS BEARER 1 |

FIG. 8(c)

| UE IDENTIFIER | UE1 | |
|---|---|---|
| APN | LIPA | |
| PGW ADDRESS | OLD 2001:100:200:300: :2 | |
| | NEW 2001:100:200:300: :3 | |
| ENB ADDRESS | N/A | |
| S1-TEID | N/A | |
| EPS BEARER ID | EPS BEARER 1 | |

FIG. 8(d)

| UE IDENTIFIER | UE1 |
|---|---|
| APN | LIPA |
| PGW ADDRESS | 2001:100:200:300: :3 |
| ENB ADDRESS | 2001:100:200:300: :3 |
| S1-TEID | TEID2 |
| EPS BEARER ID | EPS BEARER 1 |

FIG. 11(a)

| UE IDENTIFIER | UE1 |
|---|---|
| APN | LIPA |
| HoA | 2001:100:200:300::5 |
| SGW ADDRESS | 2001:1::2 |
| ENB ADDRESS | N/A |
| S1-TEID | N/A |
| EPS BEARER ID | EPS BEARER 1 |

FIG. 11(b)

| UE IDENTIFIER | UE1 |
|---|---|
| APN | LIPA |
| HoA | 2001:100:200:300::5 |
| SGW ADDRESS | 2001:1::2 |
| ENB ADDRESS | 2001:100:200:300::2 |
| S1-TEID | TEID1 |
| EPS BEARER ID | EPS BEARER 1 |

FIG. 11(c)

| UE IDENTIFIER | UE1 |
|---|---|
| APN | LIPA |
| HoA | 2001:100:200:300::5 |
| SGW ADDRESS | 2001:1::2 |
| ENB ADDRESS | 2001:100:200:300::3 |
| S1-TEID | TEID2 |
| EPS BEARER ID | EPS BEARER 1 |

| IP ADDRESS | MAC ADDRESS |
|---|---|
| 2001:100:200:300: :1/64 | 00:1E:11:22:33:11 |

| IP ADDRESS | MAC ADDRESS |
|---|---|
| 2001:100:200:300: :1/64 | 00:1E:11:22:33:11 |
| 2001:100:200:300: :4/64 | 00:1E:11:22:33:44 |

| IP ADDRESS | MAC ADDRESS |
|---|---|
| 2001:100:200:300: :5/64 | 00:1E:11:22: 33:22 |

| IP ADDRESS | MAC ADDRESS |
|---|---|
| 2001:100:200:300: :5/64 | 00:1E:11:22: 33:33 |

| NEIGHBOR DISCOVERY TRANSMITTING SOURCE IP ADDRESS | NEIGHBOR DISCOVERY TRANSMITTING SOURCE MAC ADDRESS | NEIGHBOR DISCOVERY TARGET ADDRESS | EXISTENCE TIME |
|---|---|---|---|
| 2001:100:200:300::4 | 00:1E:11:22:33:44 | 2001:100:200:300::5 | 60 SECONDS |

POSITION MANAGING APPARATUS, PACKET GATEWAY APPARATUS, MOBILE COMMUNICATION SYSTEM, MOBILE STATION APPARATUS AND MOBILE COMMUNICATION METHOD

TECHNICAL FIELD

The present invention relates to a mobile communication system or the like, that a home network in which a mobile station apparatus and a plurality of base station apparatuses including a base station apparatus having a packet gateway apparatus that establishes local PDN connection with the mobile station apparatus are connected, and a core network in which a position managing apparatus that manages a position of the mobile station apparatus and an access control apparatus that controls access of each apparatus are connected by an external network.

BACKGROUND ART

The 3GPP (The 3rd Generation Partnership Project), which is a group for standardization of a mobile communication system, has been working to specify an EPS (Evolved Packet System) described in following Non-Patent Document 1 as a next-generation mobile communication system, and has made a study on a home base station that is a small-sized base station arranged in a house or the like as a component apparatus of the EPS.

The home base station constructs a small-scaled wireless cell called a femto-cell, and using a wireless access technology same as a normal eNB (eNodeB: base station), houses UE (User Equipment: mobile terminal apparatus). In addition, by connecting to a core network of a mobile communication system via a broadband line, it is possible to relay communication data of the UE that is housed.

Further, following Non-Patent Document 2 discloses architecture candidates for realizing local IP access (LIPA: Local IP Access) in a home base station. The local IP access is a function that provides UE with direct connectivity to a network such as a home IP network to which the home base station is connected directly (hereinafter, referred to as a "home network"), so that the UE becomes possible to communication with other information terminal (for example, such as a digital video recorder or a printer) being connected to the home network not via a core network of a mobile communication system.

Moreover, as one of the architecture candidates for realizing local IP access disclosed in Non-Patent Document 2, it is proposed to arrange a PGW (Packet data GW) defined in Non-Patent Document 1 in the home base station.

The PGW is an apparatus that performs assignment of an IP address to the UE as well as functions as a gateway to an external PDN (Packet Data Network: packet communication network) such as the Internet, and in the architecture candidates that are disclosed, it is proposed to cause the home base station to function as a gateway apparatus to the home network by arranging a subset (pared-down version) of the PGW called an L-PGW in the home base station.

The femto-cell constituted by individual home base stations has a radio wave covering range limited compared to that of a normal macro-cell. Therefore, in order to connect to a home network (specifically, intranet or the like) using local IP access under an environment of an office, a school or the like, a plurality of home base stations equipped with an L-PGW are arranged in the home network so that a wider area is able to be covered compared to the case of being in a home, and each UE is to be connected to an adjacent home base station.

However, according to a conventional technology described in Non-Patent Document 1, a PGW assigns an IP address to UE, and all communication data received by the UE is transferred through the PGW serving as a gateway apparatus. In addition, change of a connecting destination PGW is not performed to continue a communication session even at the time of handover.

Accordingly, even when the UE moves (executes handover) between a plurality of home base stations equipped with an L-PGW while performing communication by local IP access under the above-described environment of an office, a school or the like, in order to continue the communication session, it is impossible to switch the connecting destination L-PGW so that communication is performed via the L-PGW assigning an IP address to this UE at all times, resulting in causing of a redundant communication path.

On the other hand, when the connecting destination L-PGW is switched to optimize a communication path, the UE has no choice but to change the IP address used for the communication, it was therefore impossible to continue the communication session at the time of handover.

Moreover, Non-Patent Document 3 discloses a method for switching a connecting destination L-PGW while maintaining a communication session at the time of handover by expanding the conventional technology described in Non-Patent Document 1.

According to the method described in Non-Patent Document 3, using the procedure defined in the IETF RFC4861, the L-PGW equipped in the home base station carries out proxy transmission of neighbor advertisement including an IP address of UE and a MAC address of the home base station into a home network (hereinafter, referred to as Proxy Neighbor Advertisement processing), and carries out a proxy reception of communication data addressed to the UE, which is transmitted into the home network, for transferring to the UE.

In addition, when it is required to switch a connecting destination L-PGW in conjunction with handover processing or service request processing (that is processing in which UE that has transited to an idle mode moves to an adjacent base station again to resume communication) of the UE, on the initiative of an MME (Mobile Management Entity) serving as a position managing apparatus in a core network, an IP address that has been used by the UE before switching is notified to a switching destination L-PGW and start of Proxy NA processing is instructed, thereby realizing maintenance of a communication session.

PRIOR ART DOCUMENTS

Non-Patent Documents

Non-Patent Document 1: 3GPP TS23. 401 General Packet Radio Service (GPRS) enhancements for Evolved Universal Terrestrial Radio Access Network (E-UTRAN) access Non-Patent Document 2: 3GPP TR 23.829 Local IP Access and Selected IP Traffic Offload Non-Patent Document 3: 3GPP contribution S2-101361 Solution 1 variant for Inter-H(e)NB mobility with L-GW relocation

SUMMARY OF THE INVENTION

Problems to be Solved by the Invention

In a conventional procedure disclosed in Non-Patent Document 3, when a procedure of switching a connecting destination L-PGW is performed in handover processing or service request processing of UE, before the UE and a moving destination home base station start a procedure of establishing a wireless bearer, an MME instructs a switching destination L-PGW equipped in the moving destination home base station to start Proxy NA processing so as to carry out proxy reception of communication data addressed to the UE in place of a switching source L-PGW.

Then, once the Proxy NA processing is started, the switching destination L-PGW carries out proxy transmission of neighbor advertisement, so that an information terminal that wants to communicate with the UE starts transmission of communication data addressed to the UE immediately to this L-PGW.

However, this L-PGW needs to buffer large quantities of communication data received from the information terminal in place of the UE until the wireless bearer establishment is normally completed, and it has been disadvantageous in light of mounting costs when taking into consideration that single L-PGW manages a plurality of UEs simultaneously.

In addition, the above-described wireless bearer establishment procedure is not always successful, and there is also a case where, for example, wireless resources to be assigned to the UE lack, or the UE is further moved during the wireless bearer establishment processing to change to a wireless environment where it is more desirable to connect with other base station, and in such a case, the wireless bearer establishment is likely to be failed or cancelled.

Accordingly, if the switching destination L-PGW starts the Proxy NA processing ahead before the wireless bearer establishment is completed, in a case where the wireless bearer establishment is failed supposedly, even if large quantities of communication data has been received, this communication data has to be discarded, which is inefficient.

In addition, in the procedure of switching a connecting destination L-PGW described in Non-Patent Document 3, an L-PGW before switching buffers communication data addressed to UE, and after receiving neighbor advertisement subjected to proxy transmission from a switching destination L-PGW, transfers this communication data to the switching destination L-PGW serving as a transmission source of the neighbor advertisement.

However, since the L-PGW before switching has no means for judging whether or not this neighbor advertisement has been really transmitted from the switching destination L-PGW, for example, even when a malicious node has transmitted the neighbor advertisement to steal the communication data addressed to the UE, the L-PGW before switching is to transfer the communication data buffered to this node unconditionally, thus posing a security problem. In addition, by using a method defined in the IETF RFC3971, it is possible to detect illegal neighbor advertisement, so that it is possible to prevent a malicious node from stealing a packet, but all nodes involving communication need to correspond to this protocol, thus posing an operational problem.

The present invention has been made in view of such circumstances and aims to provide a mobile communication system or the like, capable of continuing a communication session using local IP access while suppressing alterations to an existing system to the minimum, when UE performs service request processing or handover processing between home base stations in a plurality of home base stations that support local IP access.

Means for Solving the Problems

In view of the above-described problems, a position managing apparatus of the present invention is the position managing apparatus of a mobile communication system that a home network in which a mobile station apparatus and a plurality of base station apparatuses including a base station apparatus having a packet gateway apparatus that establishes local PDN connection with the mobile station apparatus are connected, and a core network in which the position managing apparatus that manages a position of the mobile station apparatus and an access controls apparatus that controls access of each apparatus are connected by an external network, comprising an EPS bearer context that stores a first base station apparatus in which the mobile station apparatus establishes local PDN connection with a packet gateway apparatus of the first base station apparatus;

message receiving means for receiving a message including an identifier of a second base station apparatus serving as a connecting destination of the mobile station apparatus;

local PDN connection rearranging means for requesting rearrangement of local PDN connection to a packet gateway apparatus of the second base station apparatus, when the second base station apparatus included in the message received by the message receiving means is different from the first base station apparatus stored in the EPS bearer context;

PDN connection deleting means for deleting the local PDN connection of the mobile station apparatus and the first base station apparatus; and local PDN connection setting means for instructing the second base station apparatus to start proxy transmission of neighbor advertisement instead of the mobile station apparatus after establishment of a wireless bearer is completed between the mobile station apparatus and the second base station apparatus.

A packet gateway apparatus of the present invention is the packet gateway apparatus of a mobile communication system that a home network in which a mobile station apparatus and a plurality of base station apparatuses including a base station apparatus having a packet gateway apparatus that establishes local PDN connection with the mobile station apparatus are connected, and a core network in which a position managing apparatus that manages a position of the mobile station apparatus and an access controls apparatus that controls access of each apparatus are connected by an external network, and is characterized in that the local PDN connection includes one or more EPS bearers, and address storage means for storing an address of the mobile station apparatus;

bearer change request receiving means for receiving a change request of the EPS bearer; and neighbor advertisement proxy transmission/reception starting means for, when the bearer change request is received, starting proxy transmission of neighbor advertisement instead of the mobile station apparatus using the address of the mobile station apparatus stored in the address storage means.

Further, the packet gateway apparatus of the present invention further comprises:

proxy response means for carrying out proxy response of the neighbor advertisement instead of the mobile station apparatus; and idle mode shift notification receiving means for receiving idle mode shift notification of the mobile station apparatus transmitted by the position managing apparatus, and is characterized in that when the idle mode shift notification is received by the idle mode shift notification receiving means, the proxy response by the proxy response means is stopped.

Further, the packet gateway apparatus of the present invention further comprises:

neighbor discovery proxy reception means for carrying out proxy reception of neighbor discovery addressed to the mobile station apparatus; and discovery destination address storage means for storing a transmitting source address of the neighbor discovery and a discovery destination address included in the neighbor discovery, and is characterized in that the neighbor advertisement proxy transmission/reception starting means, when the address stored in the address storage means and the discovery destination address are matched, starts proxy transmission of the neighbor advertisement to the transmitting source address stored in the discovery destination address storage means.

A mobile communication system of the present invention is the mobile communication system that a home network in which a mobile station apparatus and a plurality of base station apparatuses including a base station apparatus having a packet gateway apparatus that establishes local PDN connection with the mobile station apparatus are connected, and a core network in which a position managing apparatus that manages a position of the mobile station apparatus and an access control apparatus that controls access of each apparatus are connected by an external network, and is characterized in that the position managing apparatus comprises an EPS bearer context that stores a first base station apparatus in which the mobile station apparatus establishes local PDN connection with a packet gateway apparatus of the first base station apparatus;

message receiving means for receiving a message including an identifier of a second base station apparatus serving as a connecting destination of the mobile station apparatus;

local PDN connection rearranging means for requesting rearrangement of local PDN connection to a packet gateway apparatus of the second base station apparatus, when the second base station apparatus included in the message received by the message receiving means is different from the first base station apparatus stored in the EPS bearer context;

PDN connection deleting means for deleting the local PDN connection of the mobile station apparatus and the first base station apparatus; and local PDN connection setting means for instructing the second base station apparatus to start proxy transmission of neighbor advertisement instead of the mobile station apparatus after establishment of a wireless bearer is completed between the mobile station apparatus and the second base station apparatus.

Further, a mobile station apparatus of the present invention is a mobile station apparatus that is able to be connected to the mobile communication system of the invention described above.

A mobile communication method of the present invention is the mobile communication method in a mobile communication system that a home network in which a mobile station apparatus and a plurality of base station apparatuses including a base station apparatus having a packet gateway apparatus that establishes local PDN connection with the mobile station apparatus are connected, and a core network in which a position managing apparatus that manages a position of the mobile station apparatus and an access control apparatus that controls access of each apparatus are connected by an external network, characterized in that the position managing apparatus has an EPS bearer context stored a first base station apparatus in which the mobile station apparatus establishes local PDN connection with a packet gateway apparatus of the first base station apparatus, and comprises a step of receiving a message including an identifier of a second base station apparatus serving as a connecting destination of the mobile station apparatus;

a step of requesting rearrangement of local PDN connection to a packet gateway apparatus of the second base station apparatus, when the second base station apparatus included in the received message is different from the first base station apparatus stored in the EPS bearer context;

a step of deleting the local PDN connection of the mobile station apparatus and the first base station apparatus; and a step of instructing the second base station apparatus to start proxy transmission of the neighbor advertisement instead of the mobile station apparatus after establishment of a wireless bearer is completed between the mobile station apparatus and the second base station apparatus.

Advantages of the Invention

According to the present invention, it is possible to continue a communication session using local IP access when UE executes handover between home base stations corresponding to local IP access, while suppressing expansion to an existing system to the minimum.

BRIEF DESCRIPTION OF THE DRAWINGS

[FIG. 2] is a structural view of an MME in the first embodiment;

[FIG. 3] is a view showing an example of a subscription DB (database) of the MME in the first embodiment of the present invention;

[FIG. 4] is a view showing an example of an APN-IP address conversion DB of the MME in the first embodiment;

[FIG. 5] is a view showing an example of EPS bearer context of the MME in the first embodiment;

[FIG. 6] is a view showing an example of the EPS bearer context of the MME in the first embodiment;

[FIG. 8] is a view showing an example of EPS bearer context of the SGW in the first embodiment;

[FIG. 11] is a view showing an example of EPS bearer context of the HeNB in the first embodiment;

[FIG. 12] is a view showing an example of a neighbor cash table of the HeNB in the first embodiment;

[FIG. 15] is a view showing an example of a neighbor cash table of the information terminal in the first embodiment;

MODE FOR CARRYING OUT THE INVENTION

Description will be hereinafter given for a best mode for carrying out the present invention with reference to drawings. Note that, in the present embodiment, as an example, an embodiment of a mobile communication system when the present invention is applied thereto will be described in detail with drawings.

[First Embodiment]

First, description will be given for a first embodiment of a mobile communication system to which the present invention is applied with reference to drawings.

[1.1 Outline of Mobile Communication System]

Figure 1:
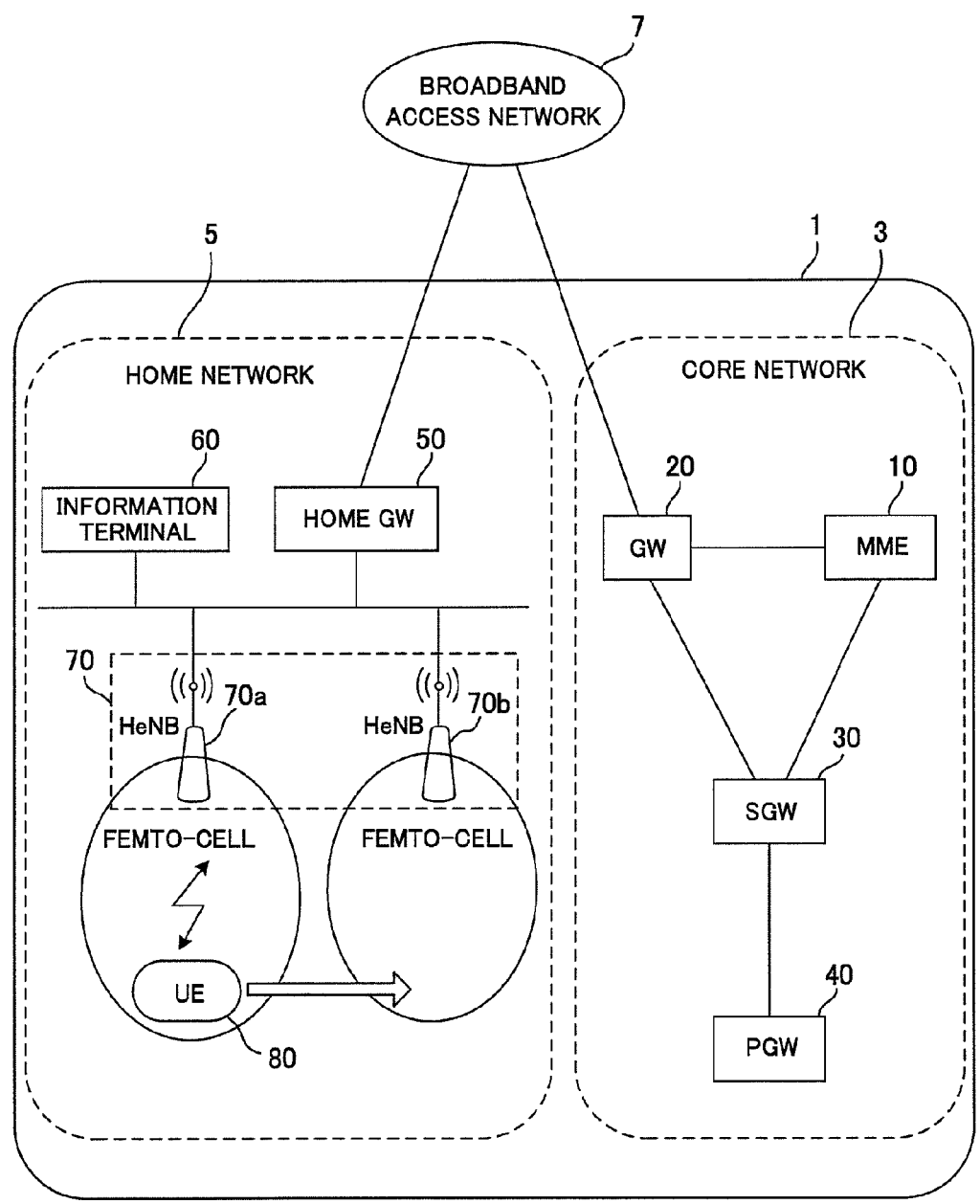
[FIG. 1] is a structural view of a mobile communication system according to a first embodiment.

FIG. 1 is a view for describing an outline of a mobile communication system 1 in the present embodiment. As shown in this drawing, the mobile communication system 1 is configured by a core network 3 and a home network 5, and the core network 3 and the home network 5 are interconnected through a broadband access network 7. The broadband access network 7 is a wired access network that realizes broadband communication and is constructed by, for example, ADSL, optical fiber or the like. However, without limitation thereto, it may a wireless access network such as WiMAX.

In the core network 3, an MME (Mobility Management Entity) 10, a GW 20, an SGW (Serving GW) 30 and a PGW (Packet data network GW) 40 are arranged.

The MME 10 is an entity that performs signaling and is a position managing apparatus that initiates position management of a mobile station apparatus (UE) and a procedure of establishing a transmission path. The transmission path refers to, for example, a logical path called an EPS bearer for transferring a user IP packet that is established for each UE, and is able to set a specific QoS level (for example, such as a guarantee bit rate).

The GW 20 functions as a gateway between an HeNB 70 (Home eNodeB: home base station) arranged in the home network 5 and an apparatus in the core network. Communication between the MME 10 and the HeNB 70 and between the SGW 30 and the HeNB 70 is performed through the GW 20.

The SGW 30 is an access control apparatus that transfers a packet between the PGW 40 and the HeNB 70.

The PGW 40 is a gateway apparatus that is connected to external PDNs (Packet Data Networks: packet communication networks) such as the Internet and functions as a gateway connecting the core network 3 and these PDNs as well as transfers communication data addressed to UE to the SGW 30. Note that, there is also a case where the PGW 40 and the SGW 30 are configured by the same nodes physically.

The home network 5 is configured by including a home GW 50, an information terminal 60, the HeNB 70 (HeNB 70a, 70b) and UE 80. In addition, the home network 5 is connected to the broadband access network 7.

The home GW 50 is a gateway apparatus between the home network 5 and the broadband access network 7, and is a conventional broadband router apparatus, for example, such as an ADSL modem-embedded router. In addition, the home GW 50 manages an IP address to be assigned to other apparatus in the home network 5, and performs assignment of an IP address to an apparatus in the home network 5 using router advertisement defined by the IPv6 Stateless Address Autoconfiguration protocol (IETF RFC4862) or a DHCP (Dynamic Host Configuration Protocol).

The information terminal 60 is an information terminal connected to the home network 5, including a printer, a digital video recorder or the like, for example.

The HeNB 70 is a home base station that forms a femto-cell and houses the UE 80 as a base station of the 3GPP LTE (Long Term Evolution). Here, the home network 5 in the present embodiment includes the HeNB 70a and the HeNB 70b.

The UE 80 is a mobile communication terminal equipped with a communication interface of the 3GPP LTE and is connected to the HeNB 70.

[1.2 Apparatus Configuration]

Subsequently, brief description will be given for each apparatus configuration with drawings. Note that, since the PGW 40 and the GW 20 are configured similarly to conventional apparatuses in a mobile communication system using the EPS, detailed description thereof will be omitted.

In addition, since the home GW 50 is configured similarly to a conventional broadband router apparatus, detailed description thereof will be omitted.

[1.2.1 Configuration of MME]

FIG. 2 shows a configuration of the MME 10 in the present embodiment. In the MME 10, a transmission/reception unit 110 and a storage unit 120 are connected to a control unit 100 through buses.

The control unit 100 is a functional unit for controlling the whole of the MME 10. The control unit 100 realizes various functions by reading and executing various programs stored in the storage unit 120, and is configured by, for example, a CPU (Central Processing Unit) or the like.

The transmission/reception unit 110 is a functional unit that is wire-connected to a router or a switch and performs transmission/reception of a packet. For example, transmission/reception is performed by Ethernet (registered trademark) generally used as a connection method of a network, or the like.

The storage unit 120 is a functional unit that stores a program, data or the like needed for various operations of the MME 10. Further, the storage unit 120 stores a subscription DB (database) 122, an APN-IP address conversion DB 124 and EPS bearer context 126.

FIG. 3 is a view showing an example of the subscription DB 122 and shows a database in which for UE managed by the mobile communication system 1, an identifier of the UE (for example, "UE 1" generated by IMSI (International Mobile Subscriber Identify: subscriber identification information) or the like), an allowed CSG identifier list (for example, "CSG 1") and a connectable APN list (for example, "LIPA") are stored to correspond to each other.

Here, a CSG (Closed Subscriber Group) identifier is a group identifier assigned to the HeNB 70, and possibility/impossibility of access of the UE 80 to the HeNB 70 is judged in accordance with the allowed CSG identifier list of the subscription DB 122. Note that, in terms of management efficiency, it is also possible to assign the same CSG identifier to a plurality of HeNBs 70 and collectively manage access authorities.

In addition, an APN (Access Point Name) is an identifier to identify a PDN in an EPS, and the UE 80 is able to request connection to the home network 5 by the APN (for example, "LIPA") even with the home network 5 connected using local IP access as the PDN.

In addition, possibility/impossibility of local IP access of the UE is determined by whether or not the connecting destination HeNB 70 is included in the allowed CSG identifier list and further whether or not the APN used for local IP access is included in the connectable APN list.

FIG. 4 is a view showing an example of the APN-IP address conversion DB 124. Here, FIG. 4(a) and FIG. 4(b) show a transition of the APN-IP address conversion DB 124 in an embodiment described below. The APN-IP address conversion DB 124 is a DB that manages an APN (for example, "LIPA"), a global eNB identifier (for example, "HeNB 1") and a PGW address (for example, "2001:100:200:300::2") to correspond to each other, and solves an IP address of a PGW (or an L-PGW which is a subset of the PGW) with the use of the APN and the global eNB identifier.

When the UE 80 switches the connecting destination HeNB 70, the MME 10, using a global eNB identifier assigned to the switching destination HeNB 70 and an APN for local IP access, refers to the APN-IP address conversion DB 124 to acquire an L-PGW address and acquire necessity of switching a termination PGW of local PDN connection and an address of a switching destination L-PGW.

Moreover, the global eNB identifier is an identifier to uniquely identify all base station apparatuses (including the home base station such as the HeNB 70) connected to the mobile communication system 1.

FIG. 5 and FIG. 6 are views showing an example of the EPS bearer context 126. FIGS. 5(a) to (d) and FIG. 6 show a transition of the EPS bearer context 126 in an embodiment described below.

The EPS bearer context 126 stores a UE identifier (for example, "UE 1"), a connected APN (for example, "LIPA"), an HoA (for example, "2001:100:200:300::5"), a PGW address (for example, "2001:100:200:300::2"), an SGW address (for example, "2001:1::2"), an eNB address (for example, "2001:100:200:300::2"), an S1-TEID (for example, TEID 1), a cell ID (for example, "ECGI (E-UTRAN Cell Global Identifier) 1"), and an EPS bearer ID (for example, "EPS bearer 1") to correspond to each other, and manages context (setting information) of an EPS bearer set for each UE.

Note that, the HoA (Home Address) shows an IP address assigned to UE. In addition, the S1-TEID is an ID of a logical path established between a base station (or an LTE base station unit 720 in the HeNB 70) and an SGW, and the S1-TEID is assigned for each EPS bearer.

Moreover, the cell ID is an identifier to uniquely identify wireless cells formed by individual eNBs also including the home base station. Note that, in the case of the home base station, the cell ID and the above-described global eNB identifier are the same.

[1.2.2 Configuration of SGW]

Figure 7:
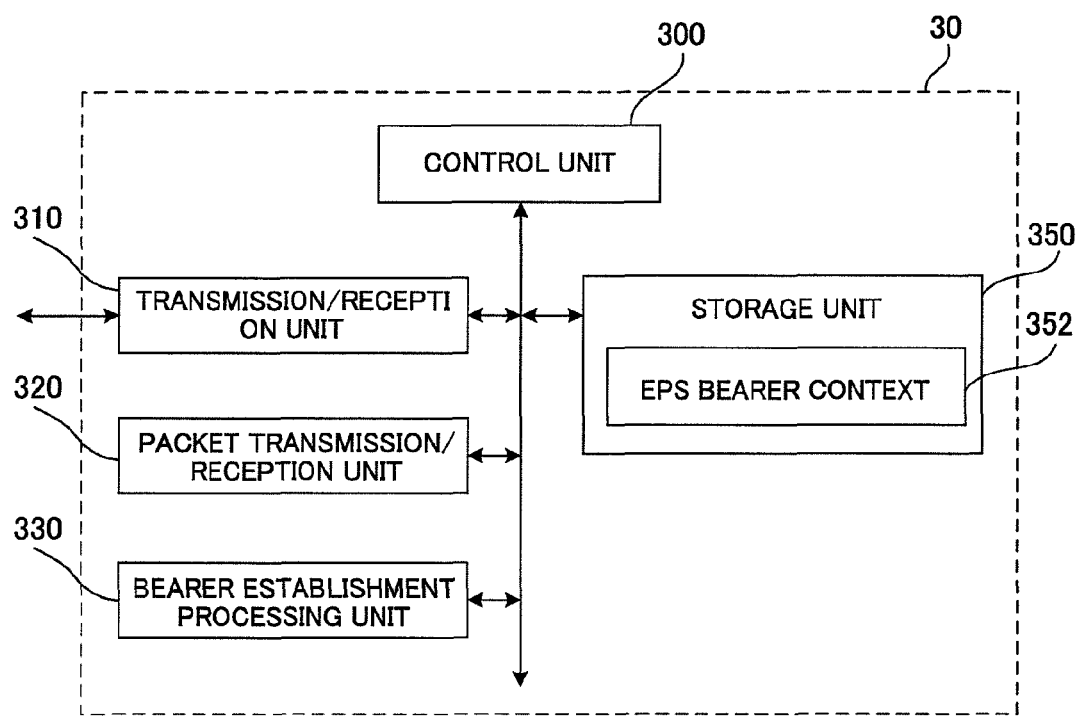
[FIG. 7] is a structural view of an SGW in the first embodiment.

Subsequently, a configuration of the SGW 30 in the present embodiment is shown in FIG. 7. In the SGW 30, a transmission/reception unit 310, a packet transmission/reception unit 320, a bearer establishment processing unit 330 and a storage unit 350 are connected to a control unit 300 through buses.

The control unit 300 is a functional unit for controlling the whole of the SGW 30. The control unit 300 realizes various functions by reading and executing various programs stored in the storage unit 350, and is configured by, for example, a CPU (Central Processing Unit) or the like.

The transmission/reception unit 310 is a functional unit that is wire-connected to a router or a switch and performs transmission/reception of a packet. For example, transmission/reception is performed by Ethernet (registered trademark) generally used as a connection method of a network, or the like.

The packet transmission/reception unit 320 is a functional unit that transmits/receives specific data (packet). Data received from an upper layer is disassembled to be transmitted as a packet. Additionally, a function of passing the received packet to the upper layer is realized.

The bearer establishment processing unit 330 is a functional unit that executes processing for establishing an EPS bearer.

The storage unit 350 is a functional unit that stores a program, data or the like needed for various operations of the SGW 30. Further, the storage unit 350 stores EPS bearer context 352.

FIG. 8 is a view showing an example of the EPS bearer context 352 and (a) to (d) are given according to a transition of the state. The EPS bearer context 352 stores a UE identifier (for example, "UE 1"), an APN (for example, "LIPA"), a PGW address (for example, "2001:100:200:300::2"), an eNB address (for example, "2001:100:200:300::2"), an S1-TEID (for example, TEID 1), and an EPS bearer ID (for example, "EPS bearer 1") to correspond to each other, and manages context of an EPS bearer set for each UE.

[1.2.3 Configuration of HeNB]

Figure 9:
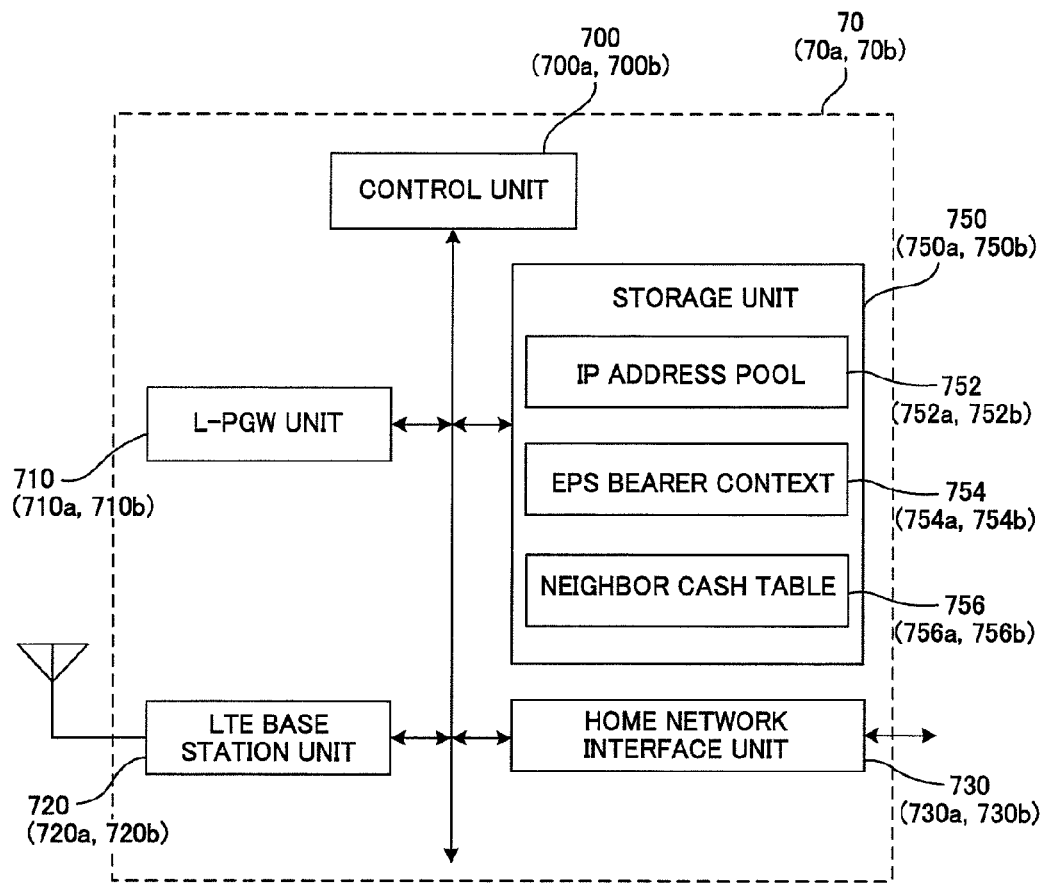
[FIG. 9] is a structural view of an HeNB (Home eNodeB: home base station) in the first embodiment.

Subsequently, a configuration of the HeNB 70 (70a, 70b) in the present embodiment is shown in FIG. 9. In the HeNB 70, an L-PGW unit 710, an LTE base station unit 720, a storage unit 750 and a home network interface unit 730 are connected to a control unit 700 through buses.

Here, the home network 5 includes the HeNB 70a and the HeNB 70b, and each of which includes the same components. That is, in the HeNB 70a, an L-PGW unit 710a, an LTE base station unit 720a, a storage unit 750a and a home network interface unit 730a are connected to a control unit 700a through buses, and in the HeNB 70b, an L-PGW unit 710b, an LTE base station unit 720*b*, a storage unit 750*b* and a home network interface unit 730*b* are connected to a control unit 700*b* through buses.

Hereinafter, in the present embodiment, description will be given comprehensively as the HeNB 70 or the like when difference of each apparatus is not particularly necessary, and it will be described as the HeNB 70*a* and 70*b* separately when it is necessary to particularly describe difference in processing of each apparatus.

The control unit 700 is a functional unit for controlling the whole of the HeNB 70. The control unit 700 realizes various functions by reading and executing various programs stored in the storage unit 750, and is configured by, for example, a CPU (Central Processing Unit) or the like.

The L-PGW unit 710 is configured as a subset (pared-down version) of the above-described PGW 40, and functions as a packet gateway apparatus that establishes local PDN connection with the UE 80, and transfers communication data addressed to the UE 80 received from the home network 5 to the UE 80 through the LTE base station unit 720. In addition, HoA assignment to the UE 80 is performed.

Note that, the L-PGW unit 710 will be described as one of functional units embedded in the HeNB 70 in the present embodiment, but may be hardware separate from the HeNB 70 as a packet gateway apparatus depending on a system configuration.

Note that, the PDN connection is a logical path established between the PGW 40 and the UE 80, and it is possible to establish a plurality of EPS bearers in one PDN connection. In addition, the local PDN connection is PDN connection established similarly between the L-PGW unit 710 that is a subset of the PGW 40 for using local IP access and the UE 80.

The LTE base station unit 720 is a functional unit that functions as a base station of E-UTRA and houses UE. In addition, an external antenna is connected to the LTE base station unit 720.

The storage unit 750 is a functional unit that stores a program, data or the like needed for various operations of the HeNB 70. Further, the storage unit 750 stores an IP address pool 752, EPS bearer context 754 and a neighbor cash table 756.

Figure 10:
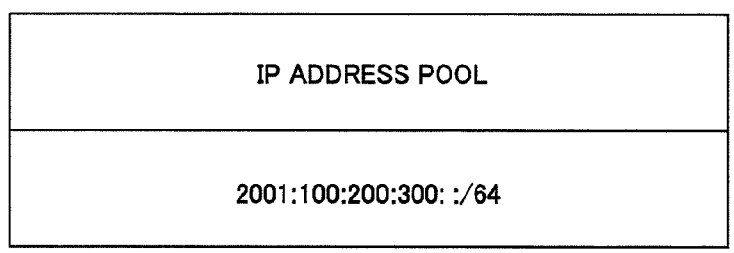
[FIG. 10] is a view showing an example of an IP address pool of the HeNB in the first embodiment.

FIG. 10 is a view showing an example of the IP address pool 752, in which an IP address prefix (for example, "2001:100:200:300::/64") assigned on the home network 5 by the home GW 50 is stored. The HeNB 70 receives router advertisement transmitted from the home GW 50, stores an IP address prefix included in the router advertisement in the IP address pool 752, and assigns an IP address using this IP address prefix (for example, "2001:100:200:300::5/64") to the UE 80 using local IP access as the HoA.

FIG. 11 is a view showing an example of the EPS bearer context 754 and (a) to (c) are given according to a transition of the state. The EPS bearer context 754 stores a UE identifier (for example, "UE 1"), an APN (for example, "LIPA"), an HoA (for example, "2001:100:200:300::5"), an SGW address (for example, "2001:1::2"), an eNB address (for example, "2001:100:200:300::2"), an S1-TEID (for example, TEID 1), and an EPS bearer ID (for example, "EPS bearer 1") to correspond to each other, and manages context of an EPS bearer set for each UE.

In addition, when transferring communication data addressed to UE, the L-PGW unit 710 refers to the EPS bearer context, and performs transfer addressed to an eNB address when the eNB address is stored, and performs transfer addressed to an SGW address when the eNB address is not stored.

FIG. 12 is a view showing an example of the neighbor cash table 756 and (a) and (b) are given according to a transition of the state. The neighbor cash table 756 stores correspondence of an IP address (for example, "2001:100:200:300::1/64") of other apparatus in the home network 5 and a MAC address (for example, "00:1 E:11:22:33:11") that is an L2 (layer 2) address.

The neighbor cash table 756 is used, when the HeNB 70 transmits an IP packet into the home network 5, to solve a MAC address of a transmitting destination apparatus from an IP address of the transmitting destination apparatus, and when the MAC address of the transmitting destination apparatus is not able to be solved supposedly, neighbor discovery is performed using a neighbor discovery protocol (IETF RFC4861) defined by the IPv6 specification or an ARP (Address Resolution Protocol) defined by the IPv4 specification, so that the MAC address of the transmitting destination apparatus is acquired and a discovery result is reflected sequentially.

Here, in the neighbor discovery protocol, two kinds of messages of neighbor discovery and neighbor advertisement are mainly defined.

The neighbor discovery is an inquiry message for acquiring a corresponding MAC address from an IP address, and is normally multicast-transmitted into a network.

In addition, the neighbor advertisement is a message that informs a surrounding terminal of correspondence of the IP address and the MAC address, and the terminal that has received the neighbor advertisement updates the neighbor cash table based on the received correspondence information of the IP address and the MAC address.

There are two kinds of forms of Solicited and Unsolicited in the neighbor advertisement, and the former is used for a response to the received neighbor discovery. In addition, the latter is used for the case of informing the surrounding terminal regardless of reception of the neighbor discovery. Further, it is possible to add option flag information to the neighbor advertisement, and by using an Override flag, for example, a terminal transmitting the neighbor advertisement is able to overwrite a neighbor cash table of a terminal receiving the neighbor advertisement forcibly.

The home network interface unit 730 is a functional unit that performs packet transmission/reception to/from other apparatus in the home network 5. For example, transmission/reception is performed by Ethernet (registered trademark) generally used as a connection method of a network, or the like.

[1.2.4 Configuration of UE]

Figures 12A, 12B, 13:
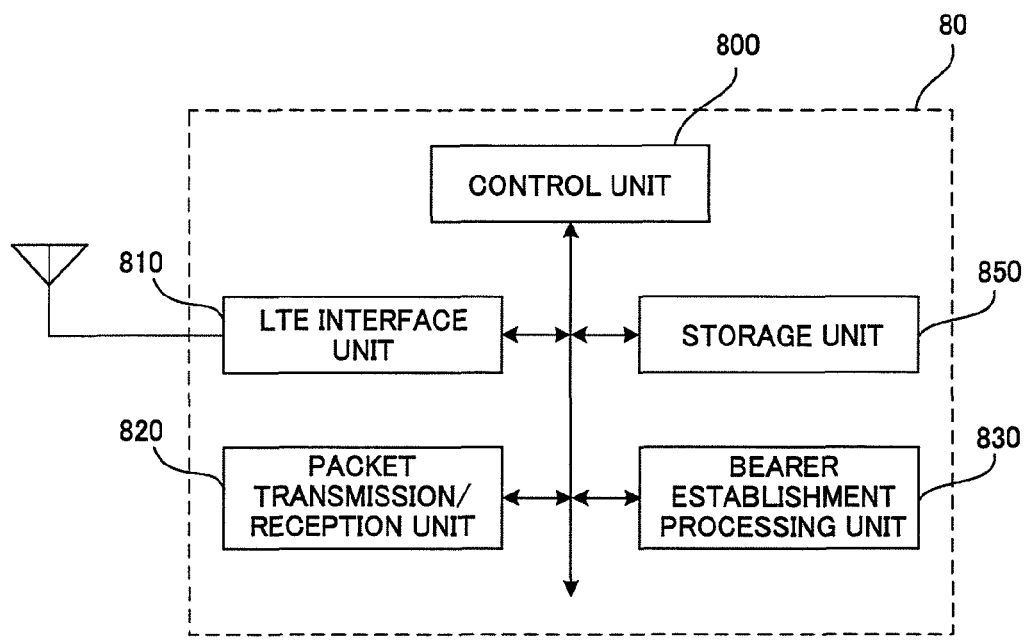
[FIG. 13] is a structural view of UE in the first embodiment.

Subsequently, description will be given for a configuration of the UE 80 serving as a mobile station. A specific example of the UE 80 is assumed to include a mobile terminal that is connected to the mobile communication system through a wireless access interface and a terminal such as a PDA. In the configuration of the UE 80, as shown in FIG. 13, an LTE interface unit 810, a packet transmission/reception unit 820, a storage unit 850 and a bearer establishment processing unit 830 are connected to a control unit 800 through buses.

The control unit 800 is a functional unit for controlling the whole of the UE 80. The control unit 800 realizes various functions by reading and executing various programs stored in the storage unit 850, and is configured by, for example, a CPU (Central Processing Unit) or the like.

The LTE interface unit 810 is a functional unit for the UE 80 to connect with a base station (a normal macro base station or a home base station). In addition, an external antenna is connected to the LTE interface unit 810.

The packet transmission/reception unit 820 is a functional unit that transmits/receives specific data (packet). Data received from an upper layer is disassembled to be transmitted as a packet. Additionally, a function of passing the received packet to the upper layer is realized.

The storage unit 850 is a functional unit that stores a program, data or the like needed for various operations of the UE 80. Further, the bearer establishment processing unit 830 is a functional unit that executes processing for establishing an EPS bearer.

[1.2.5 Configuration of Information Terminal]

Figures 14, 15A, 15B:
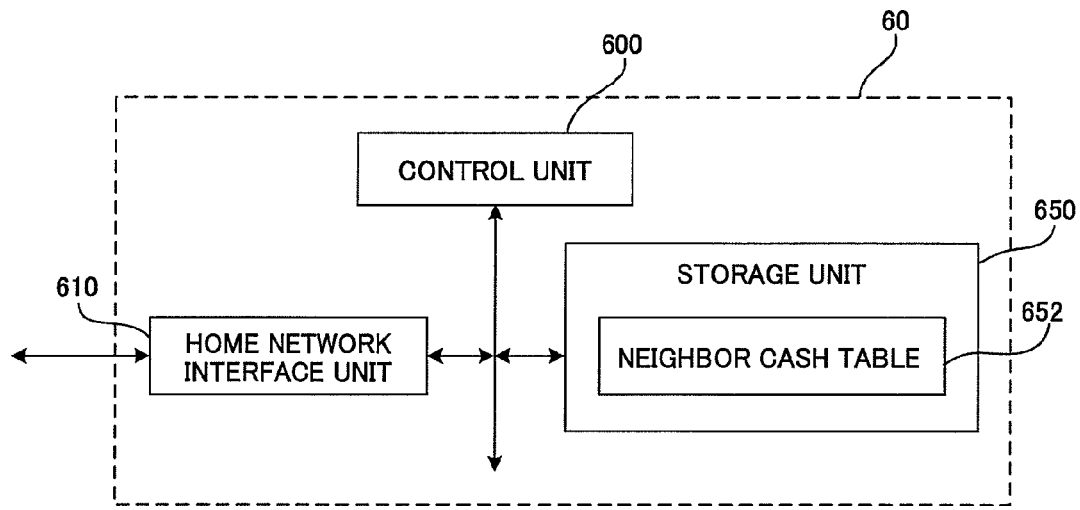
[FIG. 14] is a structural view of an information terminal in the first embodiment.

Subsequently, description will be given for a configuration of the information terminal 60 with FIG. 14. As shown in FIG. 14, in the information terminal 60, a home network interface unit 610 and a storage unit 650 are connected to a control unit 600 through buses.

The control unit 600 is a functional unit for controlling the whole of the information terminal 60. The control unit 600 realizes various functions by reading and executing various programs stored in the storage unit 650, and is configured by, for example, a CPU (Central Processing Unit) or the like.

The home network interface unit 610 is a functional unit that performs packet transmission/reception to/from other apparatus in the home network 5. For example, transmission/reception is performed by Ethernet (registered trademark) generally used as a connection method of a network, or the like.

The storage unit 650 is a functional unit that stores a program, data or the like needed for various operations of the information terminal 60. Further, the storage unit 650 stores a neighbor cash table 652.

FIG. 15 is a view showing an example of the neighbor cash table 652 and (a) and (b) are given according to a transition of the state. The neighbor cash table 652 stores correspondence of an IP address (for example, "2001:100:200:300::5/64") of other apparatus connected to the home network 5 and a MAC address (for example, "00:1 E:11:22:33:22") assigned to this apparatus.

[1.3 Description of Processing]

Next, description will be given fora procedure for the UE 80 to move between the HeNBs 70 corresponding to local IP access in the network shown in FIG. 1. Note that, though it is possible to describe basic processing for the UE 80 to be connected to the HeNB 70 corresponding to local IP access based on the standard described in Non-Patent Document 1 and Non-Patent Document 2, description will be given below while applying the present invention in detail with drawings.

Note that, it is assumed that an IP address (here, "2001: 100:200:300::4/64") is assigned from the home GW 50 to the information terminal 60. In addition, a method of IP address assignment may be assignment by router advertisement or assignment by a DHCP server in the home GW 50.

[1.3.1 Registration Processing of HeNB]

Figure 16:
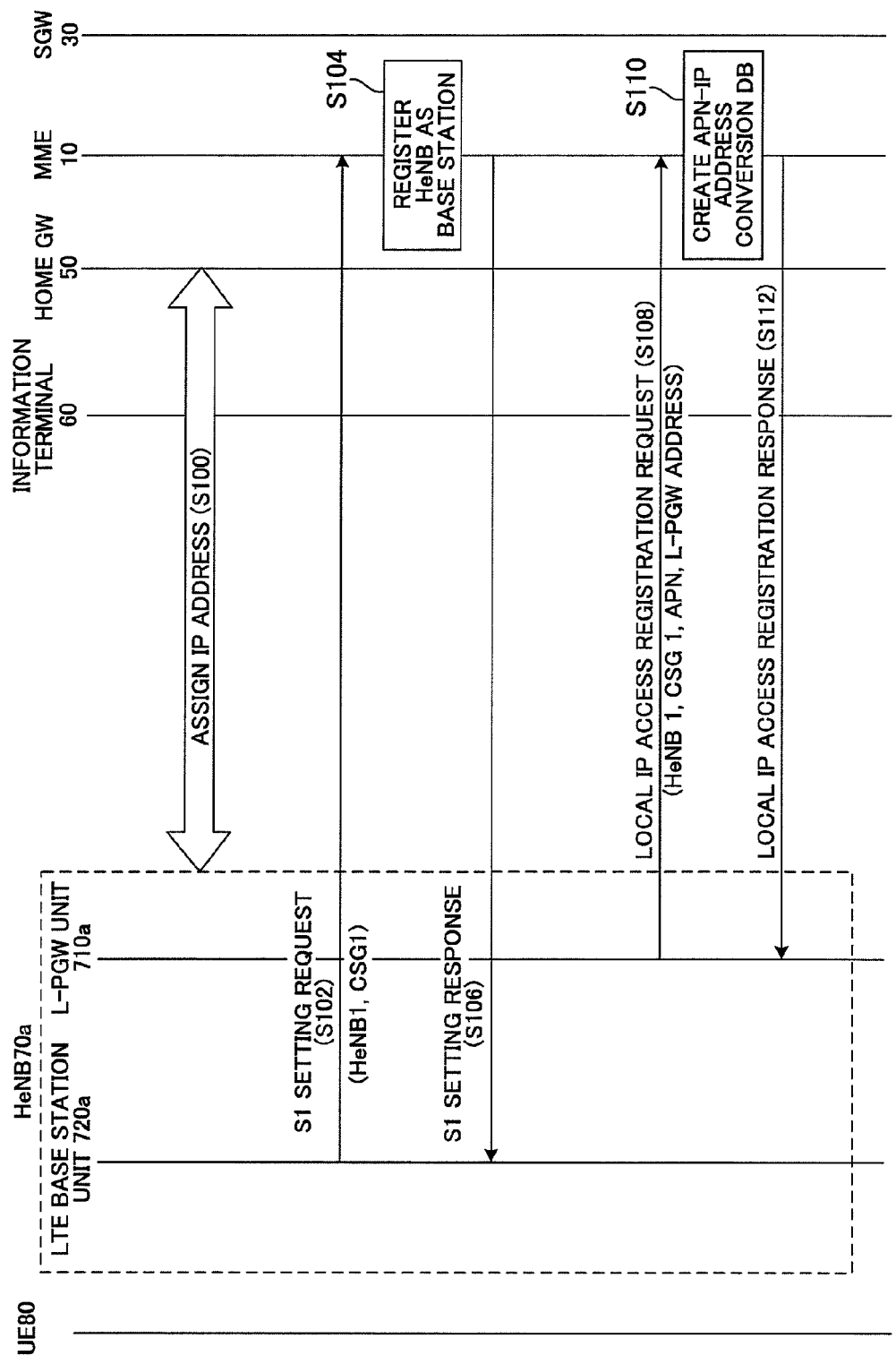
[FIG. 16] is a view showing an exemplary sequence of registration processing of the HeNB in the first embodiment.

First, the HeNB 70a performs a base station registration procedure as a base station corresponding to local IP access for the mobile communication system 1. The registration processing at this time will be described in detail with FIG. 16.

The HeNB 70a performs IP address assignment processing with the home GW 50 to acquire an IP address (S100). The IP address assigned to the HeNB 70a is an IP address using an IP address prefix (here, assuming "2001:100:200:300::/64") assigned to the home network 5 by the home GW 50, and a method of IP address assignment may be assignment by router advertisement transmitted form the home GW 50 or assignment by the DHCP.

Note that, here, "2001:100:200:300::2/64" is assigned to the HeNB 70a. In addition, this IP address is assigned to the home network interface unit 730 of the HeNB 70a.

Next, the LTE base station unit 720a transmits an S1 setting request to the MME 10 (S102). Here, the S1 setting request is a message for establishing a communication path between the LTE base station unit 720a and the MME 10 and causing the HeNB 70 to operate as the base station of the mobile communication system 1, and includes a global eNB identifier assigned to the HeNB 70 ("HENB 1") and a CSG identifier ("CSG 1"). Then, the MME 10 registers the HeNB 70a as the base station (S104) and transmits an S1 setting response (S106).

Next, differently from the conventional one, the L-PGW unit 710a transmits a local IP access registration request to the MME 10, and requests registration as a home base station providing a local IP access function to the MME 10 (S108).

The local IP access registration request includes a global eNB identifier assigned to the HeNB 70a ("HeNB 1"), a CSG identifier ("CSG 1"), an APN for local IP access ("LIPA"), and an HeNB address ("2001:100:200:300::2") as an L-PGW address.

Using the global eNB identifier, the APN, the HeNB address that are acquired, the MME 10 creates the APN-IP address conversion DB 124 of FIG. 4(a), stores the APN for local IP access, the global eNB identifier assigned to the HeNB 70a, and the HeNB address as the PGW address to be associated with each other (S110), and registers the HeNB 70a as the home base station providing the local IP access function.

Note that, though a PGW address part is for storing the IP address of the PGW 40, the HeNB 70a includes the L-PGW unit 710a inside, thus storing the HeNB address as the PGW address. This makes it possible for the MME 10 to solve the IP address of the L-PGW unit 710a inside this HeNb 70a using the global eNB identifier of the HeNB 70a connected with the UE 80 and the APN.

The MME 10 then transmits a local IP access registration response to the HeNB 70a (S112). After that, the registration processing of the HeNB 70a is completed.

Note that, since a plurality of HeNBs 70 are arranged in the home network 5 in the present embodiment, each of the HeNBs 70 performs the above-described registration processing individually. Since a unique IP address and a global eNB identifier are assigned to each of the HeNBs 70, here, at the time when the registration processing of the HeNB 70a and the HeNB 70b (HeNB 70b) is completed, the APN-IP address conversion DB 124 of the MME 10 is set as shown in FIG. 4(b).

[1.3.2 Attachment Processing of UE]

Next, the UE 80 starts attachment processing for local IP access through the HeNB 70a. The attachment processing at this time will be described in detail with FIG. 17.

The UE transmits an attachment request to the LTE base station unit 720a in accordance with the conventional method defined in above-described Non-Patent Document 1 (S120). The attachment request includes a UE identifier ("UE 1") and an APN ("LIPA") for instructing connection by local IP access.

The LTE base station unit 720a transmits the received attachment request by including its own CGS identifier ("CSG 1") and a global eNB identifier ("HeNB 1") to the MME 10 as an INITIAL UE message (S122).

The MME 10 extracts the UE identifier included in the UE message, performs user authentication in accordance with the conventional method, and further checks the CSG identifier assigned to the HeNB 70a to which the UE is connected and a connecting destination APN by the subscription DB 122 (S124).

Thereby, whether the UE 80 has an access authority to be connected to the HeNB 70a and further whether local IP access is available via the HeNB 70a are confirmed. If there is no access authority supposedly, the MME 10 transmits attachment denial to the UE via the LTE base station unit 720a and finishes the attachment processing here regarding the attachment processing as being failed.

When the attachment request of the UE 80 is allowed as a result of checking the access authority, local PDN connection establishment processing which will be described as follows is performed.

[1.3.3 Local PDN Connection Establishment Processing]

In the local PDN connection establishment processing, local PDN connection is established between the L-PGW unit 710a and the UE 80.

First, using the global eNB identifier and the APN included in the INITIAL UE message received at S122, the MME 10 makes an inquiry to the APN-IP address conversion DB 124, acquires an HeNB address ("2001:100:200:300::2"), and selects the L-PGW unit 710a of this HeNB 70a as a termination PGW of local PDN connection (S126).

Then, the MME 10 transmits a session establishment request to the SGW 30 (S128). The session establishment request includes a UE identifier (UE 1), an HeNB address as an L-PGW address, an APN ("LIPA"), and an EPS bearer ID ("EPS bearer 1").

The SGW 30 receives the session establishment request, and transmits the session establishment request to the L-PGW unit 710a based on the L-PGW address (S130). The session establishment request includes the UE identifier, the APN and the EPS bearer ID.

The L-PGW unit 710a receives the session establishment request and performs HoA generation processing which will be described next (S132). Note that, the HoA generation processing has a plurality of exemplary processing as follows depending on the IP address assignment method available by the home GW 50.

[1.3.3.1 HoA Generation Processing (First Exemplary Processing)]

Figure 18:
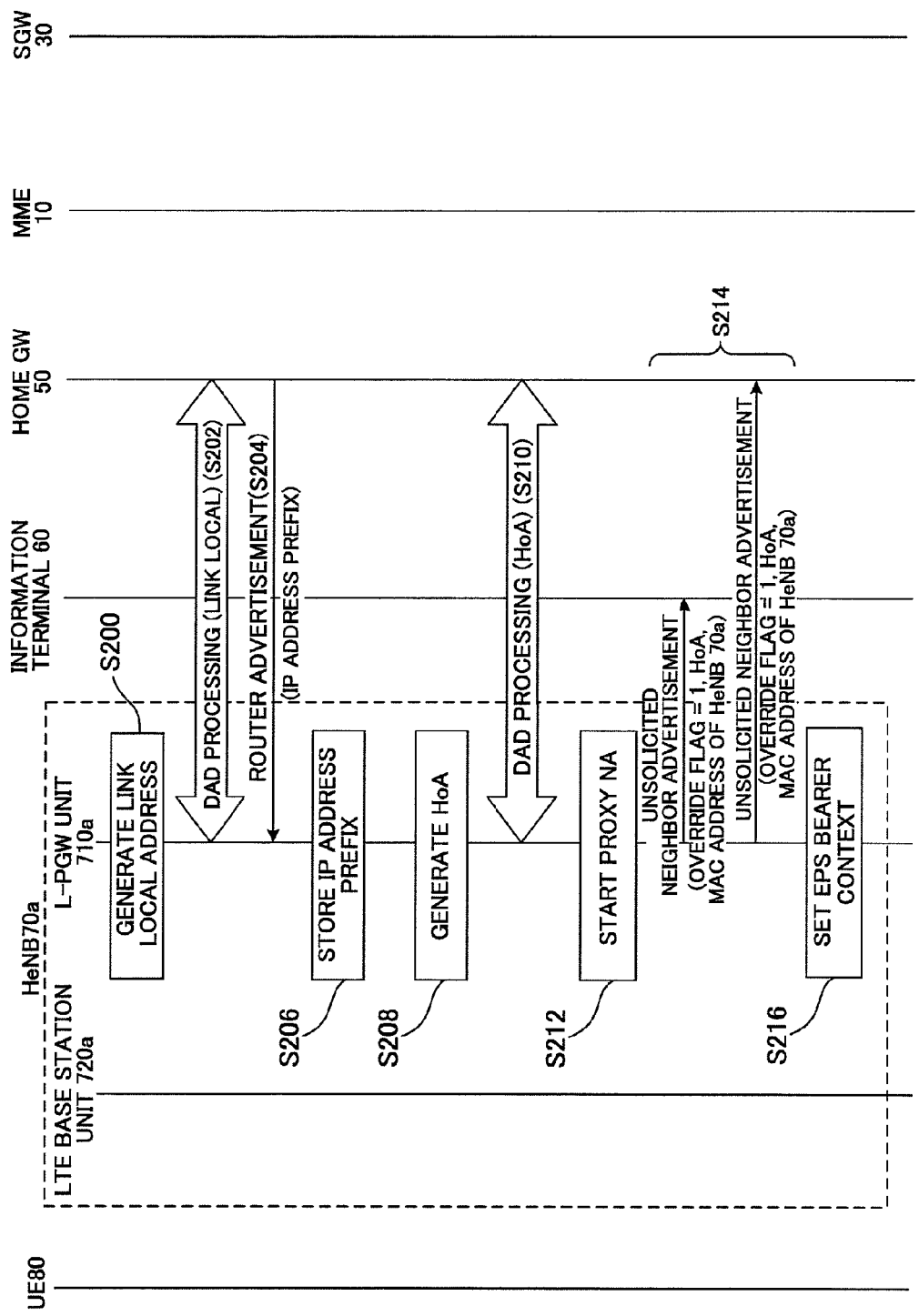
[FIG. 18] is a view showing an exemplary sequence of HoA generation processing (first exemplary processing) in the first embodiment.

FIG. 18 is a view showing HoA generation processing when the home GW 50 performs IP address assignment by router advertisement.

First, the L-PGW unit 710a generates an interface ID for the UE 80 and generates a link local address (S200). The link local address is an address effective only in the same link and is an address in which the upper 64 bits are "FE 80" and the lower 64 bits use an interface ID.

As a method for generating a bit string used for the interface ID, for example, the bit string may be generated using a hash function or the like from a UE identifier or the bit string generated randomly may be used.

Note that, in the present embodiment (first exemplary processing), "5" is assumed to be generated as the interface ID. In addition, in accordance with the IPv6 specification, as the link local address, "FE80::5" is assumed to be generated using the generated interface ID.

Next, in order to confirm uniqueness of the generated link local address, the L-PGW unit 710a performs DAD (Duplicate Address Detection) processing in accordance with the IPv6 specification (S202) and confirms that no address duplication occurs. Note that, when address duplication is detected, a different interface ID is assumed to be generated.

Then, the L-PGW unit 710a receives router advertisement transmitted from the home GW 50 periodically (S204). The router advertisement includes an IP address prefix (for example, "2001:100:200:300::/64") assigned to the home network 5 by the home GW 50.

Next, differently from the conventional one, the L-PGW unit 710a stores the received IP address prefix in the IP address pool 752a (S206) and further generates an HoA to be assigned to the UE 80 using this IP address prefix (S208). Thereby, to each of the UEs 80 connected to the plurality of HeNBs 70 that exist in the home network 5, an IP address using the common IP address prefix is assigned.

Conventionally, since a PGW (or an L-PGW that is a subset thereof) assigns a unique IP address prefix for each UE, a plurality of IP address prefixes are pooled for the individual PGWs to have an authority of assigning these IP address prefixes. In this case, when the UE switches a connecting destination PGW, authority transition to a switching destination PGW and update of IP routing path control information along with that become essential even for the IP address prefix assigned to the UE, thus making it impossible to continuously use the same HoA.

However, like the present embodiment, by generating the HoA assigned to the UE 80 using the IP address prefix assigned to the home network 5 (that is, the IP address prefix, the assignment authority of which is held by the home GW 50), even when the UE 80 switches the connecting destination HeNB 70, if the switching destination is the HeNB 70 connected to the home network 5, neither it is necessary to perform authority transition of the IP address prefix nor change to IP routing path control information is caused, so that it is ensured that the UE 80 is able to continuously use this HoA.

A network prefix part of the generated HoA (normally, for upper 64 bits) uses the received IP address prefix and an interface ID part uses the interface ID generated at S200. Note that, in the present embodiment, "2001:100:200:300::5" is assumed to be generated as the HoA.

The L-PGW unit 710a performs the DAD processing similarly even for the generated HoA and confirms that there is no address duplication (S210).

Next, the L-PGW unit 710a starts Proxy NA processing (S212) and transmits Unsolicited neighbor advertisement (S214).

In the Proxy NA processing, as a proxy node of the UE 80, neighbor advertisement including a MAC address (here, "00:1E:11:22:33:22" which is a MAC address assigned to the home network interface unit) and an HoA is transmitted, and an Override flag in the neighbor advertisement is set to be ON. Thereby, a packet addressed to the UE 80 is to be transferred to the HeNB 70a.

Finally, the L-PGW unit 710a sets the EPS bearer context 754a including the generated HoA as shown in FIG. 11(a) (S216) and completes the HoA generation processing (first exemplary processing).

Note that, the reception of the router advertisement of S204 and the storage of the IP address prefix of S206 may be executed before connection processing of the UE 80 is started (for example, within initialization processing in conjunction with turning power of the HeNB 70a ON), or the L-PGW unit 710a may prompt transmission of the router advertisement of the home GW 50 by transmitting router discovery into the home network 5 after the DAD processing of S210 is completed. In addition, when second and subsequent UEs are connected similarly, an HoA may be generated using the IP address prefix stored in the IP address pool 752a.

[1.3.3.2 HoA Generation Processing (Second Exemplary Processing)]

Figure 19:
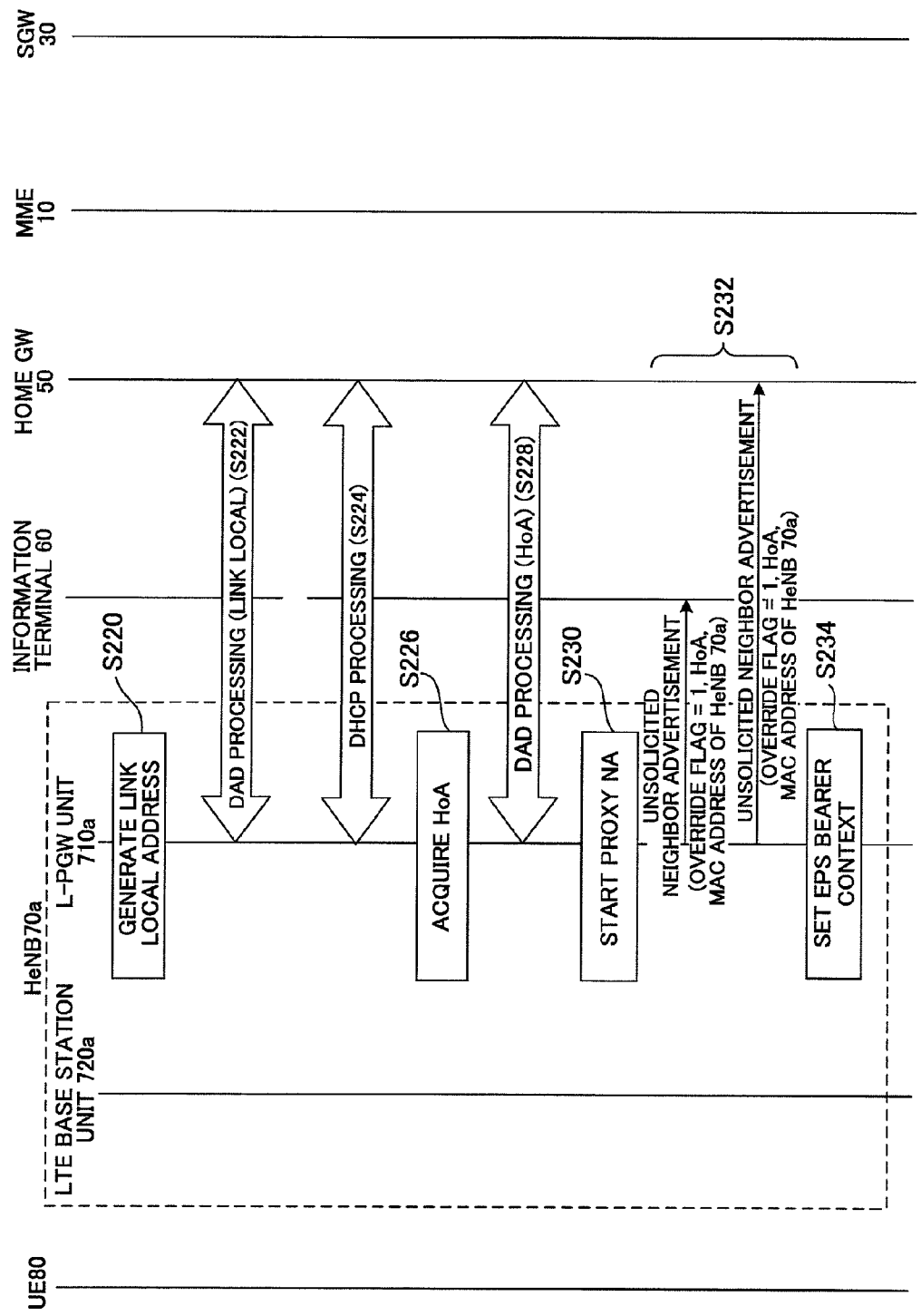
[FIG. 19] is a view showing an exemplary sequence of HoA generation processing (second exemplary processing) in the first embodiment.

FIG. 19 is a view showing HoA generation processing when the home GW 50 performs IP address assignment by a DHCP.

First, similarly to the above-described first exemplary processing, the L-PGW unit 710a generates an interface ID for the UE 80 and a link local address (S220), and performs DAD processing (S222).

The L-PGW unit 710a then performs DHCP processing with the home GW 50 (S224), acquires an IP address, and sets the acquired IP address as an HoA (S226). Note that, in the present embodiment (second exemplary processing), "2001:100:200:300::5" is assumed to be acquired as the HoA.

Next, the L-PGW unit 710a executes the DAD processing (S228) and confirms that other apparatus does not use the HoA.

The L-PGW unit 710a further continuously starts Proxy NA processing for the acquired HoA (S230) and transmits Unsolicited neighbor advertisement (S232).

Finally, the L-PGW unit 710a sets the EPS bearer context 754a as shown in FIG. 11(a) (S234) and completes the HoA generation processing (second exemplary processing).

With the above procedure, the HoA of the UE is determined and the HoA generation processing is completed. Description will be forwarded below for next processing by returning to FIG. 17 again.

The L-PGW unit 710a transmits a session establishment response to the SGW 30 (S134). The session establishment response includes the generated HoA.

The SGW 30 sets the EPS bearer context 352 as shown in FIG. 8(a) (S136) and transmits the session establishment response to the MME 10 (S138). The session establishment response includes the HoA and the L-PGW address.

The MME 10 that has received the session establishment response sets the EPS bearer context 126 as shown in FIG. 5(a) (S140), and transmits an INITIAL CONTEXT SETUP request including attachment permission to the LTE base station unit 720a (S142).

The attachment permission includes the APN and the HoA. In addition, the INITIAL CONTEXT SETUP request includes the L-PGW address and the SGW address in addition to the attachment permission.

The LTE base station unit 720a receives the INITIAL CONTEXT SETUP request and acquires the L-PGW address and the SGW address, then transmits the attachment permission to the UE 80 (S144).

The UE 80 receives the attachment permission, confirms that attachment processing to the HeNB 70a is completed, and transmits attachment completion to the LTE base station unit 720a (S146).

The LTE base station unit 720a receives the attachment completion, and transmits an INITIAL CONTEXT setting response to the MME 10 (S148). The INITIAL CONTEXT setting response includes an HeNB address as a base station address, a TEID ("TEID 1") that is newly generated, and the attachment completion received from the UE 80.

The MME 10 receives the INITIAL CONTEXT setting response, and transmits a bearer change request including the EPS bearer ID, the HeNB address and the TEID to the SGW 30 as setting information of a connecting destination base station of the UE 80 (S150).

The SGW 30 receives the bearer change request, and further transmits the bearer change request to the L-PGW unit 710a (S152). The bearer change request includes the HeNB address and the TEID.

The L-PGW unit 710a extracts the HeNB address and the TEID included in the bearer change request and updates the EPS bearer context 754a as shown in FIG. 11(b) (S154).

Thereby, local PDN connection of the UE 80 is established. Subsequently, when receiving an IP packet addressed to the UE 80 from the home network 5, the L-PGW unit 710a refers to the EPS bearer context 754a of the HeNB 70a, uses a logical path identified by an ENB address (here, "2001:100:200:300::3" which is the HeNB address) and the TEID 1 to transfer the received IP packet to the LTE base station unit 720a inside the HeNB 70a, and the LTE base station unit 720a transmits this IP packet to the UE 80.

Moreover, when the UE 80 transmits the IP packet, the LTE base station unit 720a receives it, which is transferred to the L-PGW unit 710a using the L-PGW address acquired by the INITIAL CONTEXT SETUP request of S142, and delivered to the home network 5 by the L-PGW unit 710a.

The L-PGW unit 710a further continuously transmits a bearer change response to the SGW 30 (S156), and the SGW 30 updates the EPS bearer context 352 as shown in FIG. 8(b) (S158) and transmits a bearer change response to the MME 10 (S160).

The MME 10 receives the bearer change response and updates the EPS bearer context 126 as shown in FIG. 5(b) (S162). With the above procedure, the local PDN connection establishment processing of the UE is completed.

[1.3.4 HoA Assignment Processing]

Next, HoA assignment processing is started for the UE 80 in which establishment of local PDN connection is completed (S164). Note that, depending on an IP address assignment method available by the UE 80, any one of two kinds of IP address assignment processing described as follows is performed.

In addition, though the UE 80 has already acquired the HoA in the attachment completion described in S146, processing in accordance with an IP address acquisition method defined by the IPv6 specification described below is to be performed in accordance with the method described in Non-Patent Document 1.

[1.3.4.1 HoA Assignment Processing (First EXEMPLARY PROCESSING)]

Figure 20:
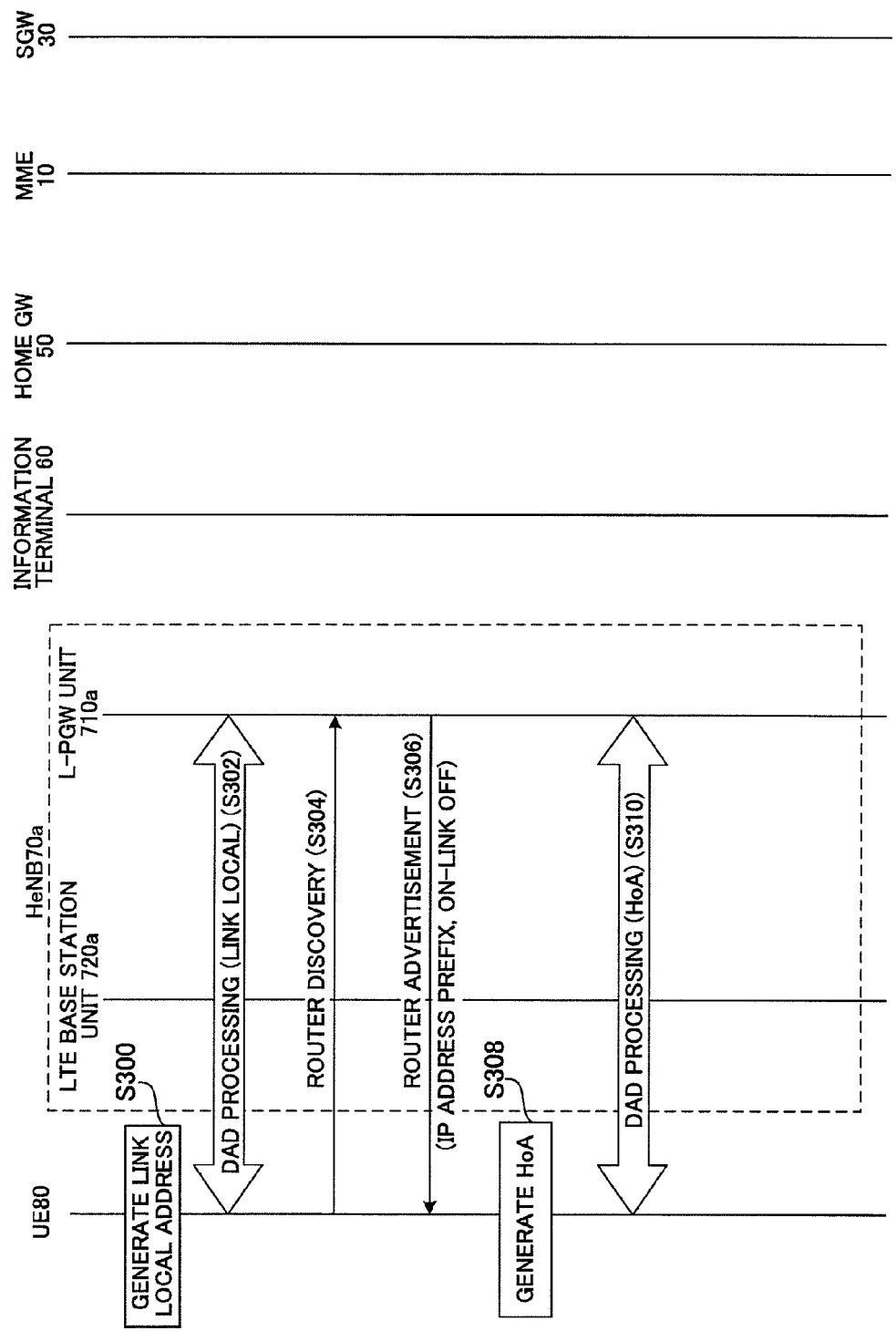
[FIG. 20] is a view showing an exemplary sequence of HoA assignment processing (first exemplary processing) in the first embodiment.

First, description will be given for first exemplary processing as HoA assignment processing. FIG. 20 is a view showing HoA assignment processing when the UE 80 uses IP address assignment by router advertisement (first exemplary processing).

First, the UE 80 uses the interface ID part of the HoA received in the attachment completion to generate a link local address (for example, "FE80::5") (S300).

Then, as to the generated link local address, DAD processing is performed with the L-PGW unit 710a, and it is confirmed that there is no address duplication (S302). Further, the UE 80 transmits router discovery (S304) and performs search of a default router.

The L-PGW unit 710a receives the router discovery and returns router advertisement (S306). The router advertisement includes the IP address prefix part (that is, "2001:100:200:300::/64") of the HoA generated at S208 or S226 of the above-described local PDN connection establishment processing using the EPS bearer context 754a, and further differently from the conventional one, an on-link flag is set to be OFF.

The on-link flag is additional information that is able to be included in the router advertisement, and is information showing whether or not the IP address prefix included in the router advertisement is on-link (that is, in the state where this prefix is assigned to a link transmitting the router advertisement).

By setting the on-link flag to be OFF, even when transmitting a packet to be addressed to an IP address whose IP address prefix part is common with that of the HoA, the UE 80 is to transmit the packet to the L-PGW unit 710*a* that is a default gateway necessarily.

Based on the received router advertisement, the UE 80 sets the L-PGW unit 710*a* as the default router, further extracts the IP address prefix included in the router advertisement, and uses this IP address prefix part and the above-described interface ID part to generate an IP address ("2001:100:200:300::5/64") (S308).

Further, the UE 80 performs DAD processing as to the generated HoA (S310), confirms uniqueness of the address, and finishes the HoA assignment processing (first exemplary processing).

[1.3.4.2 HoA Assignment Processing (Second Exemplary Processing)]

Figure 21:
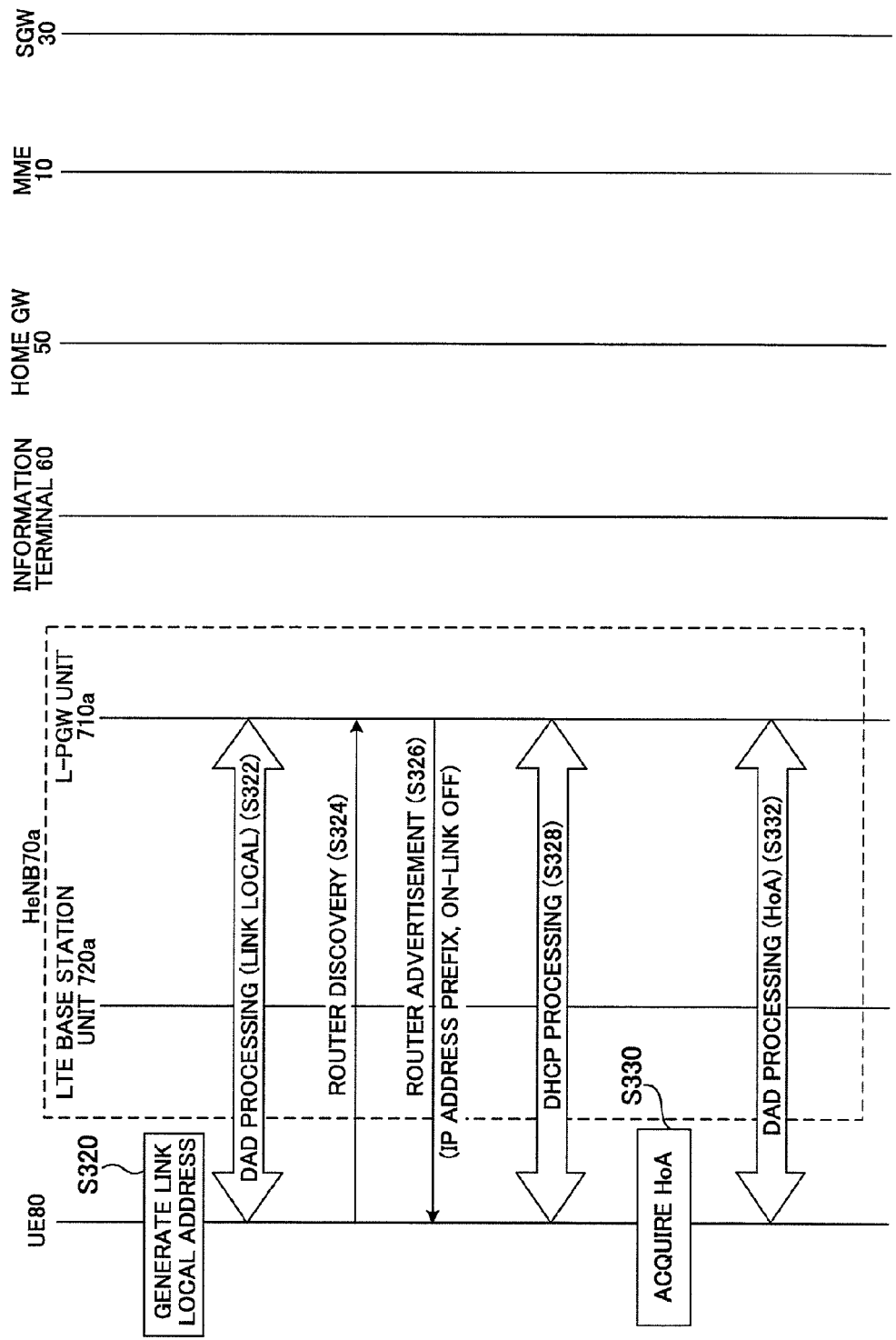
[FIG. 21] is a view showing an exemplary sequence of HoA assignment processing (second exemplary processing) in the first embodiment.

Next, description will be given for second exemplary processing as HoA assignment processing. FIG. 21 is a view showing HoA assignment processing when the UE 80 uses IP address assignment by a DHCP (second exemplary processing).

First, similarly to the above-described HoA assignment processing (first exemplary processing), the UE 80 uses an interface ID part of the HoA received in the attachment completion to generate a link local address (S320), and as to the generated link local address, performs DAD processing with the L-PGW unit 710*a* and confirms that there is no address duplication (S322).

Further, the UE 80 transmits router discovery (S324) and performs search of a default router.

The L-PGW unit 710*a* receives the router discovery and returns router advertisement (S326). Similarly to the above-described first exemplary processing, the router advertisement includes an IP address prefix, and an on-link flag is set to be OFF.

Based on the received router advertisement, the UE 80 sets the L-PGW unit 710*a* as the default router, and further performs address acquisition processing by the DHCP with the L-PGW unit 710*a* (S328). Here, the L-PGW unit 710*a* refers to the EPS bearer context 754*a* to assign the HoA generated or acquired in the above-described local PDN connection establishment processing to the UE 80.

The UE 80 acquires the HoA (S330), performs DAD processing as to the acquired HoA (S332), confirms uniqueness of the address, and finishes the HoA assignment processing (second exemplary processing).

With the above procedure, the HoA assignment processing to the UE 80 is completed, and the UE 80 becomes in the state where transmission/reception of communication data using local IP access is possible.

Note that, two kinds of HoA generation processing and two kinds of HoA assignment processing described above have difference in each method for setting an IP address, of whether it is by the IPv6 Address Autoconfiguration using router advertisement or the DHCP, but it is not necessary that the address setting method used for the HoA generation processing and the address setting method used for the HoA assignment processing are matched.

For example, in the HoA generation processing, while performing address setting by the router advertisement described in the first exemplary processing, and in the HoA assignment processing executed after that, address assignment may be performed to the UE using the DHCP for the address that is set as described in the second exemplary processing.

[1.3.5 User Data Transmission/Reception Processing]

When the local PDN connection is established and the HoA assignment to the UE 80 is completed, the UE 80 becomes possible to transmit/receive user data to/from other apparatus in the home network 5.

Figure 22:
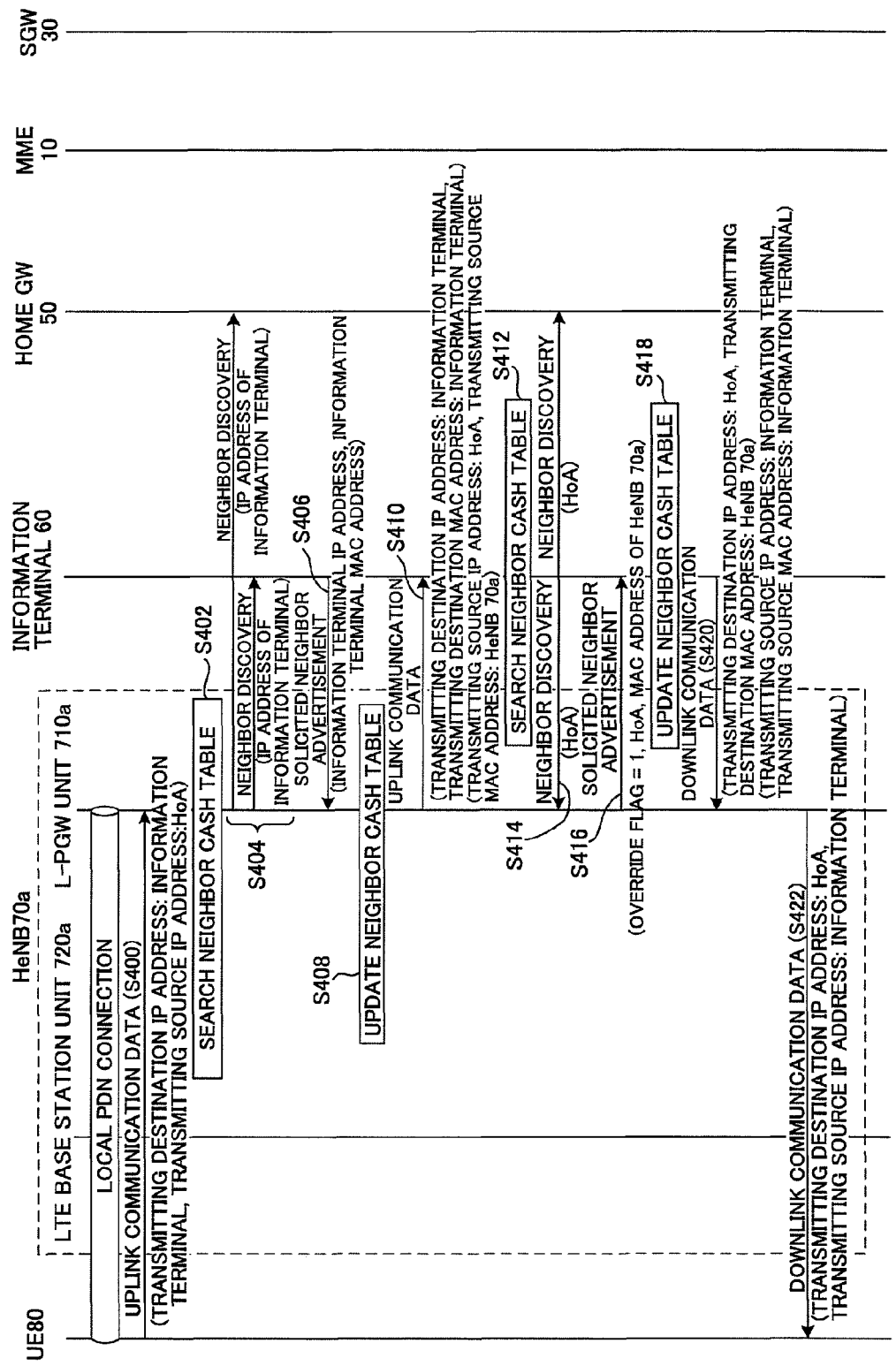
[FIG. 22] is a view showing an exemplary sequence of user data transmission/reception processing in the first embodiment.

Description will be given below for user data transmission/reception processing taking the case where the UE 80 transmits/receives user data to/from the information terminal 60 as an example with FIG. 22.

First, the UE 80 transmits uplink communication data (packet) to be addressed to the information terminal 60 (S400). Here, an IP address of a transmitting destination of the communication data is the information terminal ("2001:100:200:300::4"), and an IP address of a transmitting source is the HoA ("2001:100:200:300::5").

Note that, the IP address of the transmitting destination and the HoA have the same IP address prefix, but the UE 80 performs transmission to be addressed to the default gateway since the on-link flag in the router advertisement received at S306 or S326 is set to be OFF.

The uplink communication data reaches the L-PGW unit 710*a* serving as the default gateway using local PDN connection, and the L-PGW unit 710*a* uses the IP address of the information terminal 60 serving as the IP address of the transmitting destination to refer to the neighbor cash table 756*a* (S402).

The L-PGW unit 710*a* refers to the neighbor cash table 756*a*, and when the IP address of the information terminal 60 does not exist in the neighbor cash table 756*a*, transmits neighbor discovery to the home network 5 (S404) to search a MAC address of the information terminal 60. Note that, the neighbor discovery includes the IP address of the information terminal 60 to be searched.

The information terminal 60 and the home GW 50 receive the neighbor discovery, and the information terminal 60 transmits Solicited neighbor advertisement including its own MAC address and IP address to the L-PGW unit 710*a* (S406).

The L-PGW unit 710*a* acquires the MAC address of the information terminal 60, updates the neighbor cash table 756*a* as shown in FIG. 12(*b*) (S408), and transfers the uplink communication data received from the UE 80 at S400 to the information terminal 60 (S410).

Note that, though the IP address of the transmitting destination and the IP address of the transmitting source of the uplink communication data are not changed here, the MAC address of the information terminal 60 is added as the MAC address of the transmitting destination and further the MAC address of the HeNB 70*a* is added as the MAC address of the transmitting source.

The uplink communication data is received by the information terminal 60 based on the MAC address of the transmitting destination and the IP address of the transmitting destination.

On the other hand, when downlink communication data is transmitted from the information terminal 60 to the UE 80, the information terminal 60 firstly refers to the neighbor cash table 652 using the HoA serving as the IP address of the transmitting destination of the downlink communication data (S412).

Referring to the neighbor cash table 652, when the HoA does not exist in the neighbor cash table 652, the information terminal 60 transmits neighbor discovery to the home network 5 (S414) and searches a MAC address corresponding to the HoA. Note that, the neighbor discovery includes the HoA.

The L-PGW unit 710a and the home GW 50 receive the neighbor discovery, and the L-PGW unit 710a transmits Solicited neighbor advertisement including the MAC address of the HeNB 70a and the HoA to the information terminal 60 (S416). Note that, an Override flag is set to be ON here.

The information terminal 60 acquires the MAC address of the HeNB 70a as the MAC address corresponding to the HoA, updates the neighbor cash table 652 as shown in FIG. 15(a) (S418), and transmits the downlink communication data (S420).

Note that, here, it is assumed that the IP address of the transmitting destination of the downlink communication data is the HoA, the IP address of the transmitting source is the IP address of the information terminal 60, the MAC address of the transmitting destination is the MAC address of the HeNB 70a, and the MAC address of the transmitting source is the MAC address of the information terminal 60.

The downlink communication data reaches the L-PGW unit 710a based on the MAC address of the transmitting destination, and based on the IP address of the transmitting destination and the EPS bearer context 754a, is transferred by the L-PGW unit 710a through the LTE base station unit 720a to the UE 80 (S422), and received by the UE 80.

Note that, since the common IP address prefix is assigned to the information terminal 60 and the UE 80, both terminals become terminals belonging to the same link virtually. Accordingly, even when the L-PGW unit 710a forwards the communication data through local PDN connection, Hop-Limit (or Time To Live in the case of the IPv4) included in a header of an IP packet carrying the communication data may not be changed.

Thereby, applications running on the information terminal 60 and the UE 80 recognize each other as an apparatus existing on the same link, and, for example, the information terminal 60 is also able to operate a service discovery protocol on the same link such as UPnP (Universal Plug & Play, registered trademark).

Next, description will be given below for a procedure when the non-communication state of the UE 80 continues, and the UE 80 that has transited to the idle mode (specifically, like in the ECM IDLE state, for example, the sate where the base station does not assign wireless resources for the UE 80) described in above-described Non-Patent Document 1 moves to a cell of the HeNB 70b (hereinafter, referred to as idle mode mobility processing), and transits to the active mode (for example, ECM CONNECTED state) to resume communication (hereinafter, referred to as service request processing).

[1.3.6 Idle Mode Mobility Processing]

Figure 23:
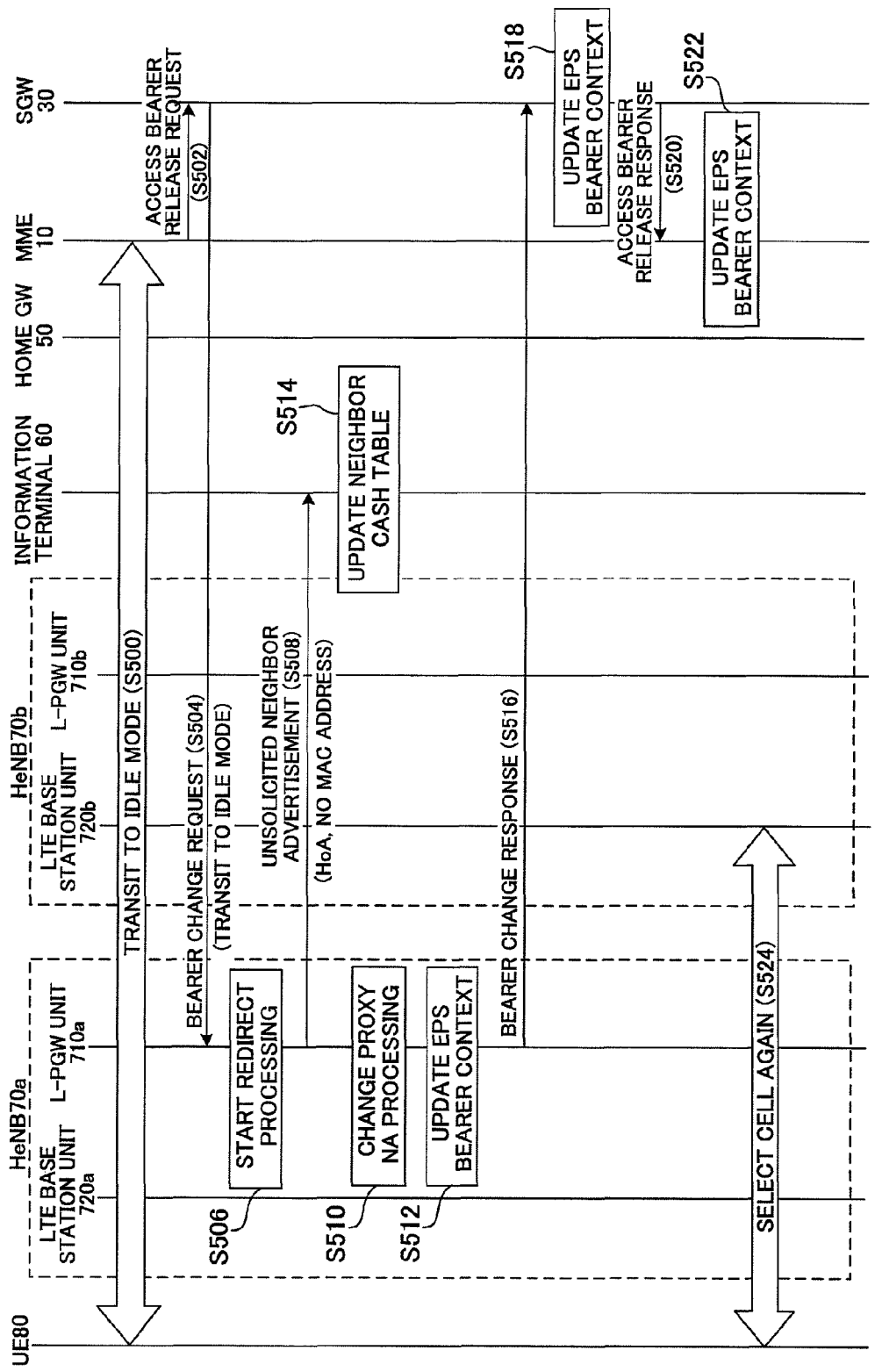
[FIG. 23] is a view showing an exemplary sequence of idle mode mobility processing in the first embodiment.

Description will be given below in detail for idle mode mobility processing of the UE 80 in the present embodiment with FIG. 23.

First, the UE 80 connected to the HeNB 70a transits to the idle mode in accordance with the method described in Non-Patent Document 1, following that the non-communication state has continued for a fixed time (for example, for one minute or more) (S500).

The MME 10 detects that the UE 80 transits to the idle mode, and transmits an access bearer release request to the SGW 30 to delete information about the base station to which the UE 80 is connected from the EPS bearer context 352 of the SGW 30 (S502).

The SGW 30 receives the access bearer release request and judges that the UE 80 has transited to the idle mode. Then, differently from the conventional one, in order to instruct the L-PGW unit 710a to perform addition processing at the time of the idle mode, a bearer change request is transmitted to the L-PGW unit 710a (S504). The bearer change request includes a flag showing that the UE transits to the idle mode.

Note that, though the MME 10 transmits the bearer change request to the L-PGW unit 710a through the SGW 30 once in the present embodiment, an instruction may be given to perform the addition processing at the time of the idle mode by transmitting the access bearer release request to the L-PGW unit 710a directly.

When transition to the idle mode is instructed by the bearer change request, the L-PGW unit 710a performs the addition processing at the time of moving to the idle mode as shown below.

First, in order to instruct the information terminal 60 that transmits communication data addressed to the HoA to the L-PGW unit 710a to execute neighbor discovery again, the L-PGW unit 710a starts redirect processing about the communication data addressed to the HoA (S506). Note that, the redirect processing is processing defined in the RFC4861 and is processing for instructing an appropriate transferring destination of received communication data to a transmission source of this communication data. Specific processing contents will be described in S604 described below. With this instruction, even when the UE 80 that has transited to the idle mode moves to other HeNB 70, the information terminal 60 becomes possible to select the appropriate transmitting destination L-PGW unit 710.

In addition, when the information terminal 60 in the home network 5 starts communication with the UE 80 again, the L-PGW unit 710a may directly instruct the information terminal 60 to delete an entry of the HoA from the neighbor cash table 652 in order to encourage to perform transmission of neighbor discovery necessarily. As a specific method, for example, Unsolicited neighbor advertisement not including a MAC address is transmitted (S508). Also with this instruction, even when the UE 80 that has transited to the idle mode moves to other HeNB 70, the information terminal 60 becomes possible to select the appropriate transmitting destination L-PGW unit 710.

Further, when the UE 80 transits to the idle mode, with respect to Proxy NA processing in execution, the L-PGW unit 710a sets so as to start service request processing described as follows without responding by transmission of neighbor advertisement to the neighbor discovery received by the L-PGW unit 710a (S510). This makes it possible to prevent that the information terminal 60 starts transmission of communication data addressed to the UE 80 before the UE 80 returns to the active mode.

Then, the L-PGW unit 710a changes the EPS bearer context 754a into FIG. 11(a) (S512), and deletes information about the base station to which the UE 80 is connected (the ENB address and the S1-TEID). A bearer change response is then transmitted to the SGW 30 (S516).

Note that, the information terminal 60 that has received the Unsolicited neighbor advertisement at S508 deletes an entry of the HoA from the neighbor cash table 652 and updates the neighbor cash table 652 (S514).

The SGW 30 receives the bearer change response and updates the EPS bearer context 352 into FIG. 8(a) (S518), and information about the base station to which the UE 80 is connected is deleted. Further, the SGW 30 transmits an access bearer release response to the MME 10 (S520).

Note that, the L-PGW unit 710a transmits the access bearer release response to the MME 10 through the SGW 30 once in the present embodiment, but may transmit the access bearer release response to the MME 10 directly.

The MME 10 receives the access bearer release response and changes the EPS bearer context 126 into FIG. 6 similarly (S522).

Subsequently, the UE 80 that has transited to the idle mode selects a wireless cell of the HeNB 70b again as a connecting destination based on radio wave strength or the like of a neighbor cell that changes depending on its own movement or the like (S524).

Note that, at the time of the idle mode, the UE 80 only receives system information (including a physical cell ID, a CSG identifier and the like) informed in each wireless cell, and does not notify an apparatus in the network such as the MME 10 of a result of cell selection. In addition, even when the UE 80 selects still another wireless cell, the apparatus in the network is not notified similarly.

[1.3.7 Service Request Processing]

Next, description will be given in detail for service request processing executed when communication is performed from the information terminal 60 to the UE 80 that has transited to the idle mode with FIG. 24.

Note that, description will be given here taking the case where the information terminal 60 does not correspond to or could not receive Unsolicited neighbor advertisement for deleting the neighbor cash table 652 transmitted at S508 described above, so that the entry of the HoA is continued to be kept in the neighbor cash table 652 as an example. Moreover, when the entry of the HoA does not exist, processing is assumed to be performed from S608 described below.

Figure 24:
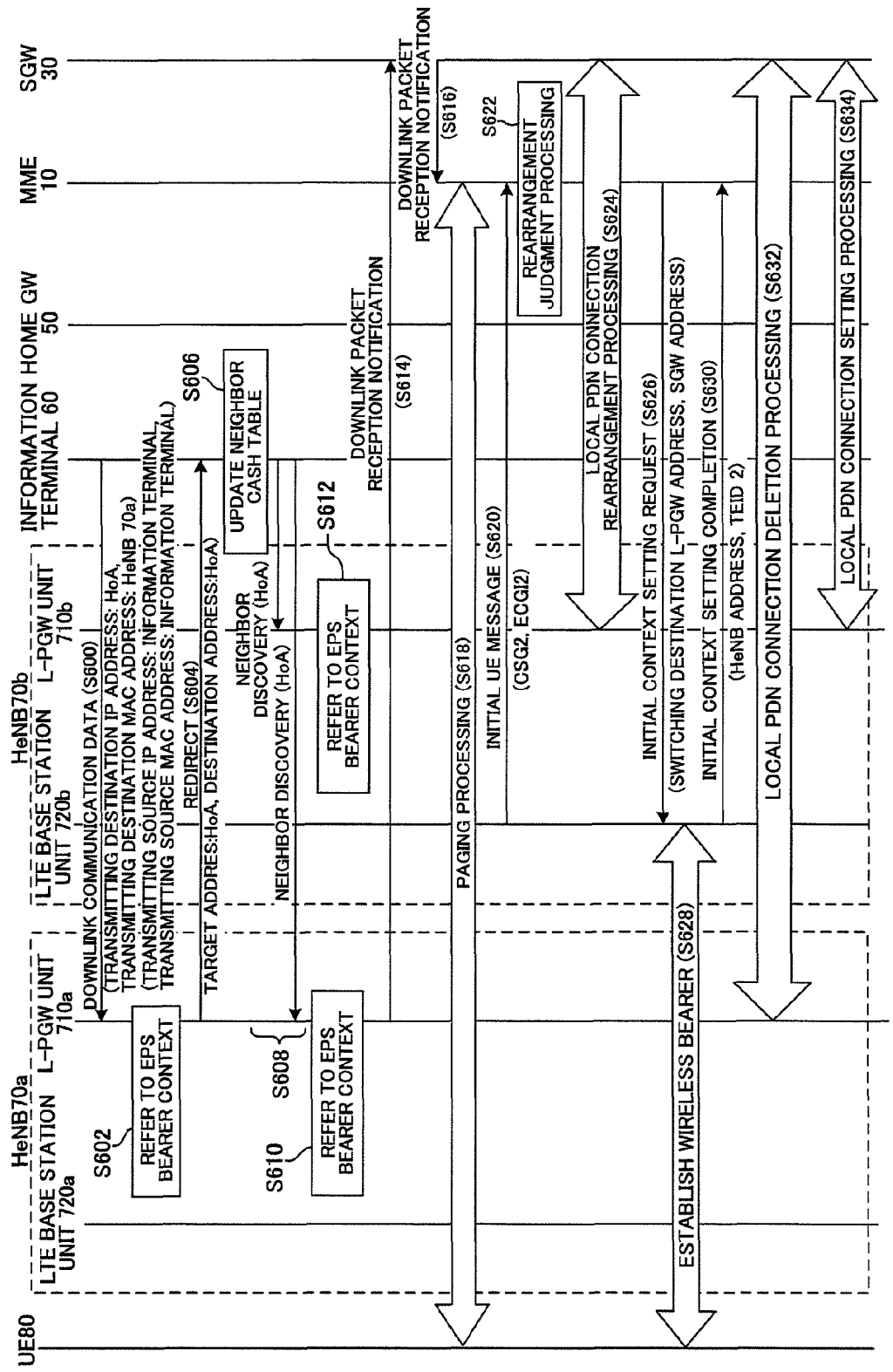
[FIG. 24] is a view showing an exemplary sequence of service request processing in the first embodiment.

First, as shown in FIG. 24, the information terminal 60 transmits downlink communication data addressed to the HoA to the L-PGW unit 710a in accordance with the neighbor cash table 652 (S600).

The L-PGW unit 710a receives the communication data and refers to the EPS bearer context 754a using an IP address of a transmitting destination (S602). Then, it is detected that the UE 80 transits to the idle mode, and differently from the conventional one, a redirect message including the received communication data is transmitted to the information terminal 60 to instruct the information terminal 60 to execute neighbor discovery (S604). Note that, the HoA is specified as an appropriate transferring destination for the redirect message.

The information terminal 60 receives the redirect message, detects that the transmitted communication data is not delivered appropriately, and deletes (updates) the entry of the HoA in the neighbor cash table 652 in accordance with the conventional operation defined in the RFC4861 (S606). The information terminal 60 then transmits the neighbor discovery to the home network 5 again (S608) and searches a MAC address corresponding to the HoA.

Each of the L-PGW unit 710a of the HeNB 70a and the L-PGW unit 710b of the HeNB 70b receives neighbor discovery and refers to the EPS bearer context 754 (S610, S612).

The L-PGW unit 710a of the HeNB 70a detects that the UE 80 corresponding to the HoA is stored in the EPS bearer context 754a. Then, because information about the base station to which the UE 80 is connected (the ENB address and the S1-TEID) is not stored in the EPS bearer context 754a, it is judged that the UE 80 has transited to the idle mode. Then, without responding by transmission of neighbor advertisement immediately, the MME 10 is caused to return the UE 80 to the active mode, and in order to establish a wireless bearer between the UE 80 and the connecting destination LTE base station unit 720, downlink packet reception notification including a UE identifier is transmitted to the SGW 30 (S614).

On the other hand, since the UE 80 is not stored in the EPS bearer context 754b, the L-PGW unit 710b of the HeNB 70b discards this neighbor discovery.

The SGW 30 receives the downlink packet reception notification (S614) and transmits the downlink packet reception notification to the MME 10 similarly (S616).

Note that, the L-PGW unit 710a transmits the downlink packet reception notification to the MME 10 through the SGW 30 once in the present embodiment, but may transmit to the MME 10 directly.

The MME 10 receives the downlink packet reception notification, detects that communication addressed to the UE 80 is started, and performs paging processing described in Non-Patent Document 1 (S618). In the paging processing, based on tracking area information transmitted by the UE 80 in the idle mode to the MME 10 periodically, a paging message including a UE identifier is transmitted to each base station included in this tracking area information.

The paging message is transmitted to each wireless cell by the base station, and the UE 80 detects that the UE 80 itself is being called based on the UE identifier included in the received paging message, transits from the idle mode to the active mode, and makes a response via the selected cell (here, the cell of HeNB 70b).

When the paging processing is completed, the LTE base station unit 720b transmits an INITIAL UE message to the MME 10 (S620). The INITIAL UE message includes a CSG identifier ("CSG 2") and a cell ID ("ECGI 2") of the LTE base station unit 720b to which the UE 80 is connected.

Figure 25:
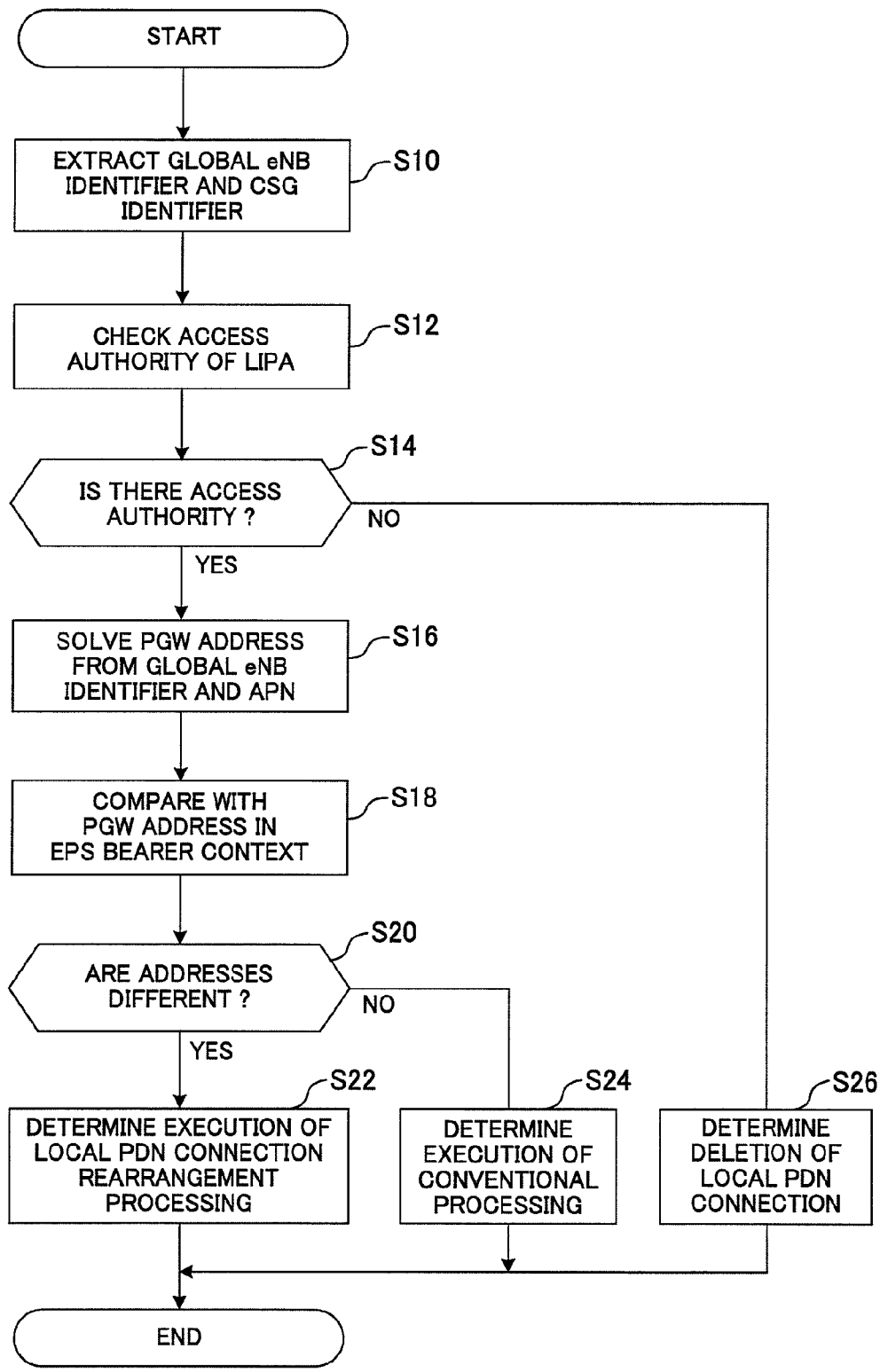
[FIG. 25] is a view showing a flowchart of rearrangement judgment processing of the MME in the first embodiment.

Here, differently from the conventional one, the MME 10 generates a global eNB identifier ("HeNB 2") from the cell ID included in the received INITIAL UE message, and executes rearrangement judgment processing for judging whether or not to perform processing for switching the L-PGW unit 710 serving as the termination of the local PDN connection using the APN to which the UE is connected and the generated global eNB identifier (hereinafter, referred to as local PDN connection rearrangement processing) (S622). Description will be given below for this rearrangement judgment processing with FIG. 25.

[1.3.7.1 Rearrangement Judgment Processing]

First, the MME 10 extracts the global eNB identifier and the CSG identifier of the HeNB 70b included in the INITIAL UE message (step S10).

Then, based on the subscription DB 122, it is checked whether the UE has an access authority for using local IP access via the HeNB 70b (step S12). Note that, in the checking procedure, the judgment processing similar to the access authority checking of step S124 in the attachment processing of the UE 80 described above is performed.

When there is an access authority (step S14; Yes), the global eNB identifier and the APN stored in the EPS bearer context 126 are used and the APN-IP address conversion DB 124 is referred to acquire (solve) a PGW address (Step S16).

On the other hand, when there is no access authority (step S14; No), in accordance with the conventional method, the local PDN connection is deleted (step S26) and the processing is completed. In this case, the UE 80 is not able to use the local IP access after connection of the HeNB 70b.

After the PGW address is acquired at step S16, the PGW address included in the EPS bearer context 126 and the PGW address that is newly acquired are compared (step S18).

Here, when two PGW addresses are different (step S20; Yes), it is judged that it is necessary to change the L-PGW unit 710 serving as the termination of the local PDN connection (specifically, to change from the L-PGW unit 710a to the L-PGW unit 710b), it is determined to perform local PDN connection rearrangement processing described below, and the judgment processing is finished (step S22).

On the other hand, when two PGW addresses are matched at step S18 (step S20; No), it is judged that the termination of the local PDN connection is the same, and it is determined to finish the judgment processing as it is and execute the conventional processing (step S24).

Note that, since each of the HeNBs 70 is provided with the L-PGW unit 710 in the present embodiment, the case where two PGW addresses are matched does not exist, but, for example, when the L-PGW unit 710 is set as an independent apparatus and is connected with a plurality of HeNBs 70, there is a case where two PGW addresses are matched. In this case, the local PDN connection rearrangement processing of the embodiment of the present invention is not performed and it is determined to perform the conventional service request processing.

[1.3.7.2 Local PDN Connection Rearrangement Processing]

Figure 26:
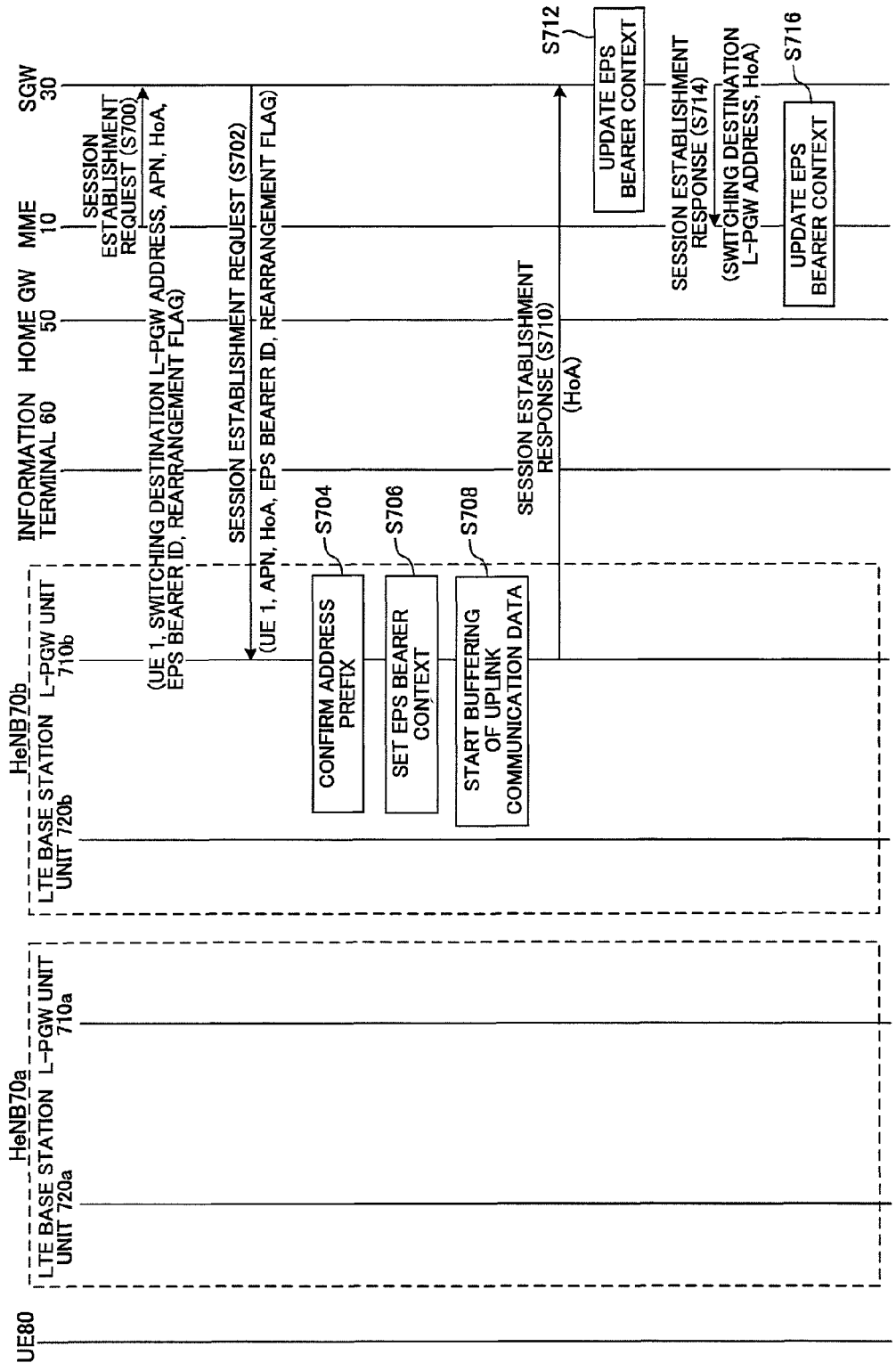
[FIG. 26] is a view showing an exemplary sequence of local PDN connection rearrangement processing in the first embodiment.

Description will be given below in detail for local PDN connection rearrangement processing when it is determined to perform rearrangement of local PDN connection by the above-described rearrangement judgment processing with FIG. 26.

First, the MME 10 transmits a session establishment request to the SGW 30 (S700). Here, the session establishment request includes a UE identifier, an HeNB 70b address as a switching destination L-PGW address, an APN, an HoA, an EPS bearer ID ("EPS bearer 1") and a rearrangement flag, based on the EPS bearer context 126.

Note that, the HeNB 70b address uses the PGW address acquired based on the APN-IP address conversion DB 124 at step S16 of the above-described rearrangement judgment processing.

Moreover, the rearrangement flag is a flag for explicitly instructing rearrangement of the local PDN connection that has been already set to the EPS bearer context 352.

The SGW 30 receives the session establishment request, and when rearrangement is instructed, does not perform error processing by regarding the EPS bearer context 352 about this UE 80 as having been already set, but transmits the session establishment request to the L-PGW unit 710b serving as a switching destination newly (S702). The session establishment request includes the UE identifier, the APN, the HoA, the EPS bearer ID and the rearrangement flag.

Note that, in the present rearrangement processing, the HoA is not newly generated like in the above-described local PDN connection establishment processing, but the same HoA needs to be used even after handover so that communication transmitted/received by the UE 80 is able to be continued. Accordingly, the HoA is clarified in the session establishment request at S700 and S702 described above, and the L-PGW unit 710b of the HeNB 70b serving as a moving destination is notified of the HoA that was used before the UE 80 shifted to the idle mode.

In addition, the MME 10 transmits the session establishment request to the L-PGW unit 710b through the SGW 30 once in the present embodiment, but may transmit to the L-PGW unit 710b directly.

The L-PGW unit 710b receives the session establishment request, and when rearrangement is instructed, judges that this session establishment request is a request by the local PDN connection rearrangement processing.

However, since the HoA is explicitly included in the session establishment request instead of including the rearrangement flag in the session establishment request of S702, it may be judged that this session establishment request is different from the session establishment request in the attachment processing (S130) and judged as a request by the local PDN connection rearrangement processing.

First, it is confirmed that whether or not an IP address prefix of the received HoA and an IP address prefix assigned to the home network 5 are matched, and it is confirmed that the specified HoA is under the management control of the HeNB 70b (S704).

Note that, the confirmation of whether IP address prefixes are matched may be performed, for example, by comparing with the IP address prefix included in router advertisement received from the home GW 50 by the HeNB 70b or by comparing with the address prefix of the IP address assigned to the home network interface unit 730b.

Then, because of being under the local PDN connection rearrangement processing, the L-PGW unit 710b does not start Proxy NA processing at this time, but creates the EPS bearer context 754b of FIG. 11(a) (S706).

Conventionally, since the Proxy NA processing is started here and transmission of neighbor advertisement is started instead of the UE 80, the information terminal 60 transmits communication data addressed to the UE 80 before a wireless bearer is established between the UE 80 and the LTE base station unit 720, but in the present embodiment, the Proxy NA processing is not started at this stage, so that the communication data addressed to the UE 80 is not received from the information terminal 60 and buffering processing of downlink communication data becomes unnecessary.

Then, when receiving uplink communication data transmitted from the UE 80, the L-PGW unit 710b sets so as to start buffering processing without transmitting this data to the home network 5 instantly (S708) and transmits a session establishment response including the HoA to the SGW 30 (S710).

Note that, when it is impossible to confirm matching of the IP address prefixes at S704, it is judged that the specified HoA is an address out of the management control of the HeNB 70b and it is judged that it is impossible to continue the communication by the same HoA after handover. Then, an HoA is newly generated and included in the session establishment response. As the generation of the HoA, the HoA generation processing described in S200 to S216 or S220 or S234 described above is performed.

The SGW 30 receives the session establishment response, updates the EPS bearer context 352 as shown in FIG. 8(c), and stores each of the L-PGW address before switching and the L-PGW address of the switching destination (S712). The session establishment response is then transmitted to the MME 10 (S714). The session establishment response includes the switching destination L-PGW address and the HoA.

Note that, the L-PGW unit 710b transmits the session establishment response to the MME 10 through the SGW 30 once in the present embodiment, but may transmit to the MME 10 directly by including the switching destination L-PGW address and the HoA.

The MME 10 receives the session establishment response, updates the EPS bearer context 126 as shown in FIG. 5(c), and stores each of the L-PGW address before switching and the switching destination L-PGW address similarly to the SGW 30. With the above, the local PDN connection rearrangement processing is completed.

Returning to FIG. 24 again, description will be given for remaining processing of the service request processing. The MME 10 transmits an INITIAL CONTEXT setting request to the LTE base station unit 720b (S626). The INITIAL CON- TEXT setting request includes the switching destination L-PGW address and the SGW address.

Note that, in the above-described registration processing of the HeNB 70, the cell ID and the HeNB 70b address are stored to be correspond to each other, and the MME 10 solves the corresponding HeNB 70b address using the cell ID of the HeNB 70b included in the INITIAL UE message received at S620 to set as a transmitting destination of the INITIAL CONTEXT setting request. In addition, when the above-described solved IP address of the HeNB 70b and the switching destination L-PGW address are matched, instead of including the switching destination L-PGW address in the INITIAL CONTEXT setting request, a loop-back address (that is an IP address showing itself and "::1" in the case of the IPv6) may be included.

The LTE base station unit 720b performs assignment of wireless resource and establishment of a wireless bearer with the UE 80 (S628) and transmits INITIAL CONTEXT setting completion to the MME 10 (S630). The INITIAL CONTEXT setting completion includes the HeNB 70b address as the ENB address and a TEID 2 that is newly generated. Note that, here, when the loop-back address is included as the switching destination L-PGW address in the INITIAL CONTEXT setting request, the loop-back address may be included similarly as the HeNB 70b address.

After the establishment of the wireless bearer is completed, the MME 10 performs local PDN connection deletion processing described as follows in order to delete the EPS bearer context 754a of the HeNB 70a before movement (S632), and further the MME 10 performs local PDN connection setting processing in order to instruct the L-PGW unit 710b to start Proxy NA processing, with completion of the establishment of the wireless bearer (S634).

[1.3.7.3 Local PDN Connection Deletion Processing]

Figure 27:
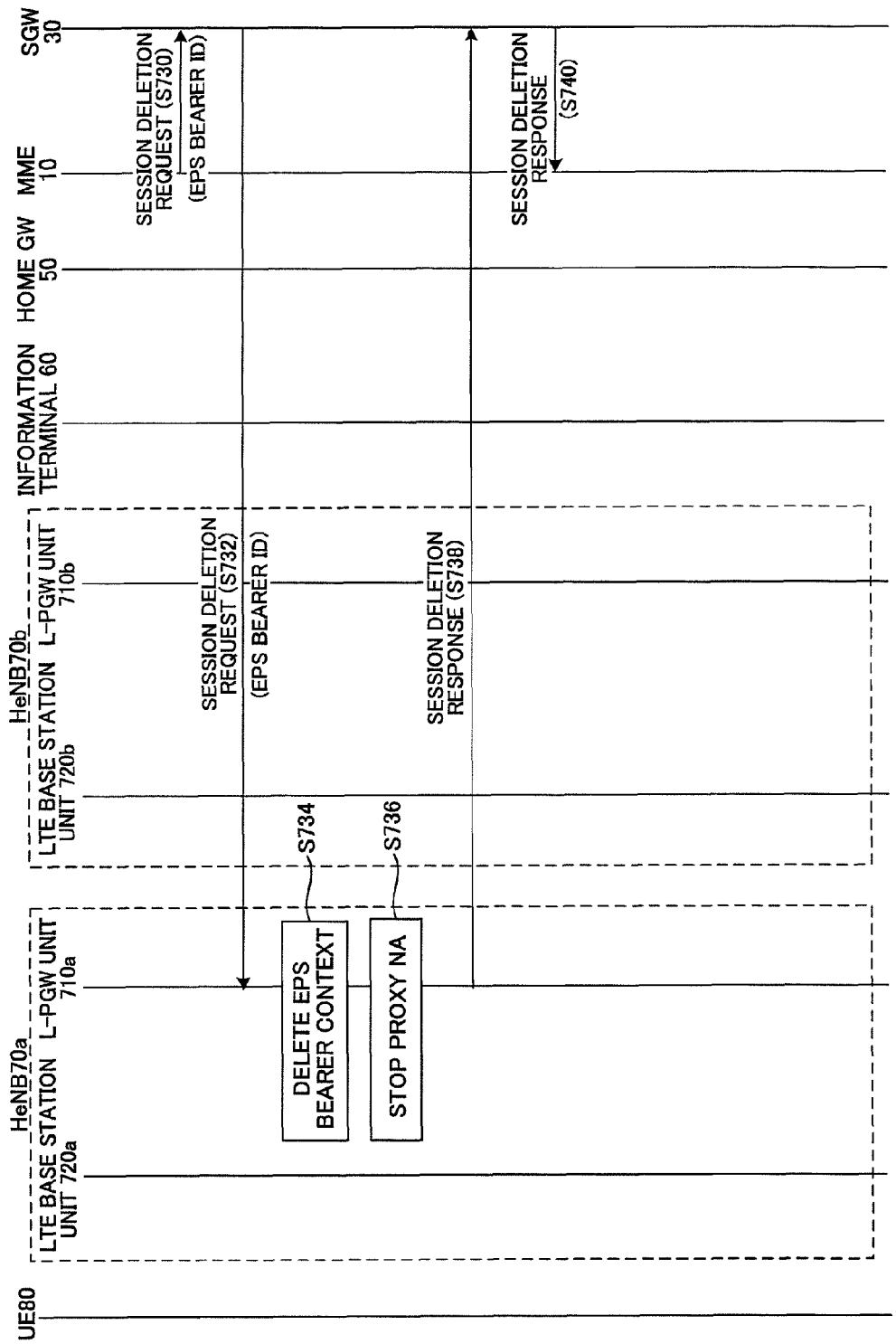
[FIG. 27] is a view showing an exemplary sequence of local PDN connection deletion processing in the first embodiment.

Here, description will be given in detail with FIG. 27 for the local PDN connection deletion processing at S632 of FIG. 24.

First, the MME 10 transmits a session deletion request to the SGW 30 to delete the EPS bearer context 754a of the HeNB 70a before movement (S730). The session deletion request includes an EPS bearer ID ("EPS bearer 1").

Based on the EPS bearer ID included in the received session deletion request, the SGW 30 acquires an IP address of the L-PGW unit 710a of the HeNB 70a as the PGW address before switching from the EPS bearer context 352, and transmits the session deletion request to the L-PGW unit 710a (S732). The session deletion request includes the EPS bearer ID. Note that, the MME 10 transmits the session deletion request to the L-PGW unit 710a through the SGW 30 once in the present embodiment, but may transmit to the L-PGW unit 710a directly.

The L-PGW unit 710a receives the session deletion request and deletes the EPS bearer context 754a of the corresponding UE 80 (S734). Further, the Proxy NA processing is stopped (S736), and if communication data addressed to the UE 80 is received after that, this data is discarded. A session deletion response is then transmitted to the SGW 30 (S738).

The SGW 30 receives the session deletion response and transmits the session deletion response to the MME 10 (S740). With the above, the local PDN connection deletion processing is completed. Note that, the L-PGW unit 710a transmits the session deletion response to the MME 10 through the SGW 30 once in the present embodiment, but may transmit to the MME 10 directly.

[1.3.7.4 Local PDN Connection Setting Processing]

Description will be given for local PDN connection setting processing in the present embodiment with FIG. 28.

First, with completion of the establishment of the wireless bearer between the UE 80 and the LTE base station unit 720b, the MME 10 transmits a bearer change request to the SGW 30 to set information about the base station to which the UE 80 is connected (the ENB address and the S1-TEID) to the EPS bearer context 754b of the HeNB 70b (S800). Here, the bearer change request includes an EPS bearer ID, an HeNB 70b address (or a loop-back address) as a moving destination ENB address, and a TEID 2.

The SGW 30 receives the bearer change request and transmits the bearer change request to the L-PGW unit 710b (S802). Here, the bearer change request includes the EPS bearer ID, the moving destination HeNB 70b address (or the loop-back address), and the TEID 2. Note that, the MME 10 transmits the bearer change request to the L-PGW unit 710b through the SGW 30 once in the present embodiment, but may transmit to the L-PGW unit 710b directly.

The L-PGW unit 710b receives the bearer change request, confirms that the ENB address and the S1-TEID are not set yet to the EPS bearer context 754b at that time, and since the received bearer change request includes the moving destination HeNB 70b address and the TEID 2, judges to notify of that the establishment of the wireless bearer between the UE 80 and the LTE base station unit 720b is completed and the EPS bearer is secured from the L-PGW unit 710b to the UE 80 via the LTE base station unit 720b.

Then, it is detected that the Proxy NA processing is not started, the Proxy NA processing is started (S804), and Unsolicited neighbor advertisement is transmitted to the home network 5 (S806). In addition, when neighbor discovery including the HoA is received, it is set so that the neighbor advertisement including a MAC address of the HeNB 70b is returned. Thereby, the information terminal 60 is to select the L-PGW unit 710b as a transmitting destination of communication data addressed to the UE 80.

Note that, the information terminal 60 is to receive not the Solicited neighbor advertisement but the Unsolicited neighbor advertisement of S806 as a response to the neighbor discovery transmitted at S608, and therefore transmits the neighbor discovery again in accordance with the specification of RFC4861 (S808). In this case, the L-PGW unit 710b returns the Solicited neighbor advertisement to the information terminal 60 (S810).

In addition, when before the transmission of the Unsolicited neighbor advertisement by the L-PGW unit 710b (S806), the remaining time of a retransmission timer of the neighbor discovery transmitted at S608 runs out, the information terminal 60 transmits the neighbor discovery similarly to S808, so that the L-PGW unit 710b makes a response with the Solicited neighbor advertisement (S810).

In accordance with the received Solicited neighbor advertisement, the information terminal 60 updates the neighbor cash table 652 into FIG. 15(b) (S821) and becomes in the sate where transmission of the communication data addressed to the UE 80 is possible.

The L-PGW unit 710b updates the EPS bearer context 754b as shown in FIG. 11(c) (S814), and when the L-PGW unit 710b receives the communication data addressed to the UE 80, it is set so as to be transferred to the LTE base station unit 720b. Note that, even when the loop-back address is set as the HeNB 70b address, the L-PGW unit 710b is set so as to transfer the received communication data with itself as the LTE base station unit 720b using the loop-back address, so that the operations become similar.

Further, the buffering processing set at S708 is stopped, and transfer of communication data to the home network 5 is started by including the uplink communication data of the UE 80 that has been buffered so far (S816). The L-PGW unit 710*b* then transmits a bearer change response to the SGW 30 (S818).

Note that, in the steady state after the Proxy NA processing is started, neighbor discovery including the HoA is transmitted from the information terminal 60, and when this neighbor discovery is received (S820), the L-PGW unit 710*b* returns Solicited neighbor advertisement to the information terminal 60 (S822).

The SGW 30 receives the bearer change response, confirms that EPS bearer context is newly set to the HeNB 70*b*, updates the EPS bearer context 352 as shown in FIG. 8(*d*) (S824), and transmits the bearer change response to the MME 10 (S826).

The MME 10 updates the EPS bearer context 126 as shown in FIG. 5(*d*) (S828) and completes the local PDN connection setting processing. With the above, the service request processing is completed. Note that, the L-PGW unit 710*b* transmits the bearer change response to the MME 10 through the SGW 30 once in the present embodiment, but may transmit to the MME 10 directly.

After that, communication data addressed to the UE 80 received from the home network 5 is to be transmitted to the HeNB 70*b*, and the UE 80 performs user data transmission/reception processing while continuously using the IP address same as before shifting to the idle mode. Note that, since the user data transmission/reception processing is similar to S400 to S422 described above, description thereof will be omitted.

In this manner, in the service request processing in the present embodiment, differently from the conventional service request processing, before establishment of a wireless bearer is started, only local PDN connection rearrangement processing is performed as pre-processing for the switching destination L-PGW and the Proxy NA processing is not started. Then, after the wireless bearer is established reliably, the local PDN connection deletion processing and the local PDN connection setting processing are performed and the switching destination L-PGW is instructed to start the Proxy NA processing.

Conventionally, before the establishment of the wireless bearer is completed, the Proxy NA processing by the switching destination L-PGW is started, so that buffering processing by the switching destination L-PGW becomes necessary until the establishment of the wireless bearer is completed, it has been disadvantageous in light of mounting costs when taking into consideration that single L-PGW manages a plurality of UEs simultaneously.

In addition, there is also a case where the procedure of establishing a wireless bearer is failed depending on the situation of assignment of wireless resource or the like, so that when the switching destination L-PGW starts Proxy NA processing ahead before the establishment of the wireless bearer is completed, if the establishment of the wireless bearer is failed supposedly, even when large quantities of communication data is received, this communication data has to be discarded, which is inefficient.

In the present embodiment, since transmission of communication data addressed to the UE 80 from the information terminal 60 to the switching destination L-PGW is started after the establishment of the wireless bearer is completed, the switching destination L-PGW does not need to perform buffering of downlink communication data.

Moreover, in the present embodiment, when the UE 80 transits to the idle mode, the MME 10 notifies the L-PGW of that the UE 80 transits to the idle mode. The L-PGW then changes the Proxy NA processing, and when receiving neighbor discovery about the HoA from the information terminal 60, starts only service request processing and sets so as not to make a prompt response of neighbor advertisement to the information terminal 60.

Thereby, it is prevented before happening that the information terminal 60 transmits the communication data addressed to the UE 80 to the L-PGW (710*a*) that has been connected before transit to the idle mode, and further it is possible that the timing when the information terminal 60 updates the neighbor cash table 652 and the timing when transmission of the communication data addressed to the UE 80 is started are delayed to be after the establishment of the wireless bearer, so that transfer of the communication data becomes unnecessary between the L-PGW (710*a*) before switching and the switching destination L-PGW (710*b*).

Further, in the present embodiment, using that transmission of communication data of an application by the information terminal 60 is started for the first time after a MAC address of a transmitting destination is solved by neighbor advertisement, when the L-PGW receives communication data from other terminal in the home network 5 after the UE 80 has transited to the idle mode, redirect processing is performed and the transmitting source terminal is prompted to perform neighbor discovery again.

Thereby, the L-PGW may regard only reception of neighbor discovery as a trigger of start of the service request processing, and it is possible to simplify the processing of the L-PGW.

In addition, since the L-PGW before switching neither transfers communication data addressed to the UE 80 that has been buffered to a transmission source of neighbor advertisement like the conventional technology described in Non-Patent Document 3, there is also no risk that the communication data addressed to the UE 80 is stolen by a malicious node.

Moreover, in the present embodiment, since UEs connected to the HeNB 70 connected to the home network 5 are able to share the same IP address prefix with each other by the above-described HoA generation processing, it is also possible to realize efficient use of an IP address space compared to a method for assigning a unique IP address prefix for each UE conventionally.

Further, when performing these processing, the UE may perform the conventional operation of the UE defined by Non-Patent Document 1, and it is possible to realize handover between home base stations at the time of using local IP access while suppressing the specification change to the existing UE to the minimum.

Note that, for convenience of description, though description has been given in the present embodiment taking the case there is one information terminal as an example, it is assumed that even the case where a plurality of information terminals are connected to the home network 5 functions similarly.

In addition, though description has been given in the present embodiment taking the case where the information terminal 60 serving as a communication partner of the UE 80 exists in the home network 5 as an example, without limitation thereto, it is assumed that even the case where the information terminal that exists out of the home network 5 and the UE perform communication through the home GW 50 functions similarly.

[Second Embodiment]

Subsequently, description will be given for a second embodiment to which the present invention is applied. In the present embodiment, since a network configuration and an apparatus configuration are similar to those of the above-described first embodiment except for the configuration of the HeNB, detailed description thereof except for the configuration of the HeNB will be omitted.

[2.1 Apparatus Configuration]

First, brief description will be given for an apparatus configuration with drawings. As described above, description will be given for an HeNB 72 serving as a different character from that of the first embodiment in the present embodiment.

[2.1.1 Configuration of HeNB]

Figures 29, 30:
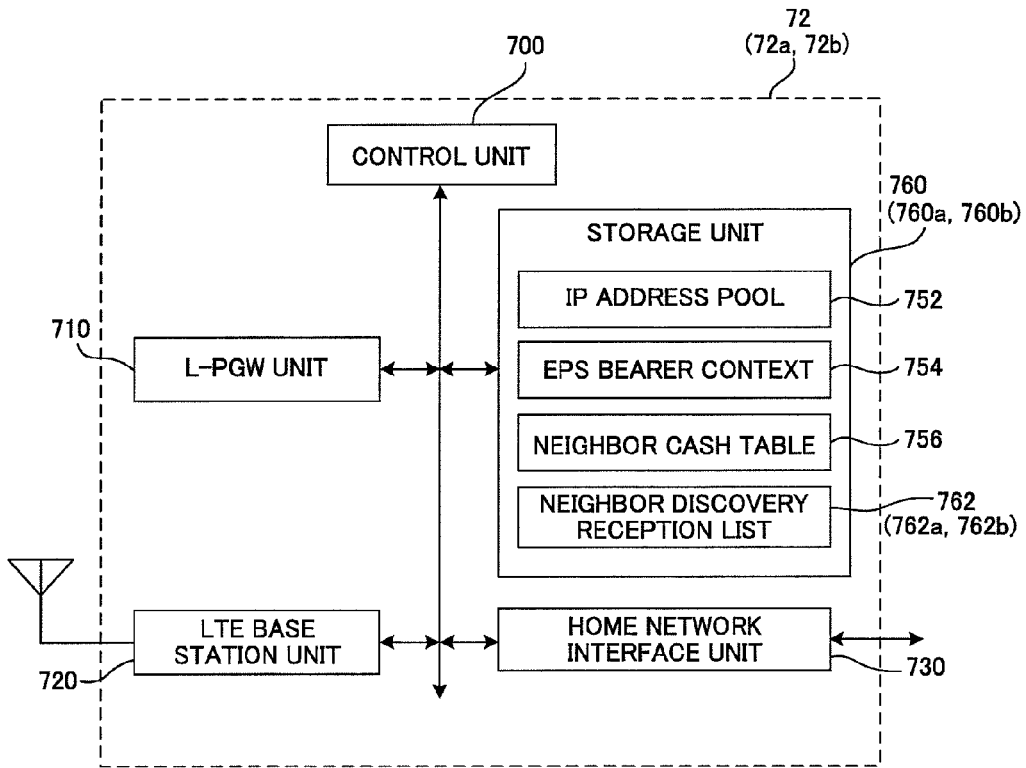
[FIG. 29] is a structural view of an HeNB in a second embodiment.
[FIG. 30] is a view showing an example of a neighbor discovery reception list of the HeNB in the second embodiment.

FIG. 29 is a view showing an example of the configuration of the HeNB 72 in the present embodiment, which is different from the configuration of the HeNB 70 in the first embodiment in terms of that a neighbor discovery reception list (762a, 762b) is recorded in a storage unit 760 (760a, 760b). Note that, similarly to the first embodiment, the home network 5 includes an HeNB 72a and an HeNB 72b, and each of which has the storage units 760a and 760b. Description will be comprehensively given as the HeNB 72 when difference of each apparatus is not particularly necessary, and it will be described as the HeNB 72a and 72b separately when it is necessary to describe processing of each apparatus.

FIG. 30 is a view showing an example of the neighbor discovery reception list 762, and the HeNB 72 stores a transmitting source IP address (for example, "2001:100:200:300::4") included in neighbor discovery received from the home network 5 by the HeNB 72, a transmitting source MAC address (for example, "00:1 E:11:22:33:44"), a neighbor discovery target address (for example, "2001:100:200:300::5"), and existence time (for example, "60 seconds") to correspond to each other.

Here, when the neighbor discovery is received, the existence time is set to time that is set in advance (for example, "60 seconds"), and a timer is started after that. When the existence time has elapsed, information about this neighbor discovery is deleted from the neighbor discovery reception list.

Since other configuration is similar to that of the HeNB 70 of the first embodiment described in FIG. 9, detailed description thereof will be omitted.

[2.2 Description of Processing]

First, similarly to the first embodiment, the UE 80 performs attachment processing and local PDN connection establishment processing, and further performs idle mode mobility processing. Since this attachment processing, this local PDN connection establishment processing, and this idle mode mobility processing are similar to those of the first embodiment, description thereof will be omitted.

Next, communication with the UE 80 in the state of the idle mode is started and service request processing is performed. Here, in the service request processing in the present embodiment, differently from the first embodiment, the L-PGW unit 710b of the HeNB 72 serving as a switching destination holds an HoA included in the neighbor discovery transmitted from the information terminal 60. Description will be given below in detail for the service request processing of the present embodiment.

[2.2.1 Service Request Processing]

Figure 31:
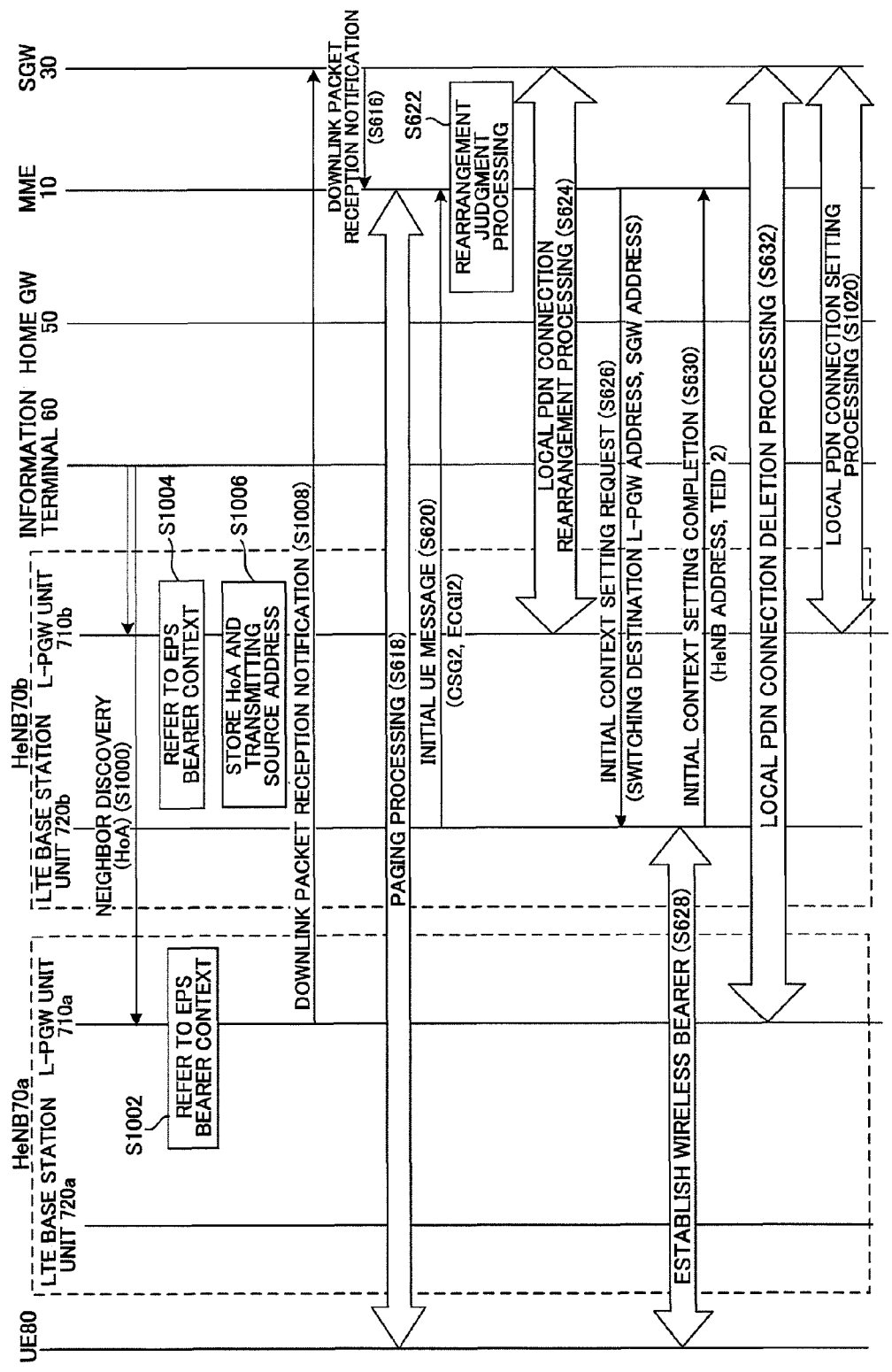
[FIG. 31] is a view showing an exemplary sequence of service request processing in the second embodiment.

FIG. 31 shows the service request processing in the present embodiment executed when communication with the UE 80 that transits to the idle mode is performed from the information terminal 60.

Note that, here, description will be given taking the case where the information terminal 60 does not hold an entry of an HoA in the neighbor cash table 652 as an example. When the entry of the HoA is held, S600 to S606 of the service request processing described in the first embodiment are to be performed in advance. In addition, same reference numerals are added to the same processing as the service request processing described in the first embodiment, and detailed description thereof will be omitted.

First, the information terminal 60 transmits neighbor discovery to the home network 5 (S1000), and searches a MAC address corresponding to the HoA.

The L-PGW unit 710a of the HeNB 72a and the L-PGW unit 710b of the HeNB 72b respectively receive the neighbor discovery and refer to the EPS bearer contexts 754a and 754b (S1002, S1004).

The L-PGW unit 710a of the HeNB 72a detects that the UE 80 corresponding to the HoA is stored in the EPS bearer context 754a, and transmits downlink packet reception notification including a UE identifier to the SGW 30 to make the UE in the active mode (S1008).

On the other hand, differently from the first embodiment, since the UE 80 is not stored in the EPS bearer context 754b, the L-PGW unit 710b of the HeNB 72b stores a transmitting source IP address and a transmitting source MAC address of neighbor discovery, and an HoA subjected to inquiry as a neighbor discovery target address in the neighbor discovery reception list 762b as shown in FIG. 30 (S1006).

In the subsequent processing, similarly to the service request processing of the first embodiment, the SGW 30 receives the downlink packet reception notification, and transmits the downlink packet reception notification to the MME 10 similarly (S616). Note that, the L-PGW unit 710b of the HeNB 72b transmits the downlink packet reception notification to the MME 10 through the SGW 30 once in the present embodiment, but may transmit to the MME 10 directly.

Then, the MME 10 starts paging processing (S618), and similarly to the first embodiment, continuously performs the rearrangement judgment processing, the local PDN connection rearrangement processing, the local PDN connection deletion processing (S620 to S632), and the local PDN connection setting processing (S1020).

Here, description will be given below in detail for local PDN connection setting processing in the present embodiment.

[2.2.1.1 Local PDN Connection Setting Processing]

Figure 32:
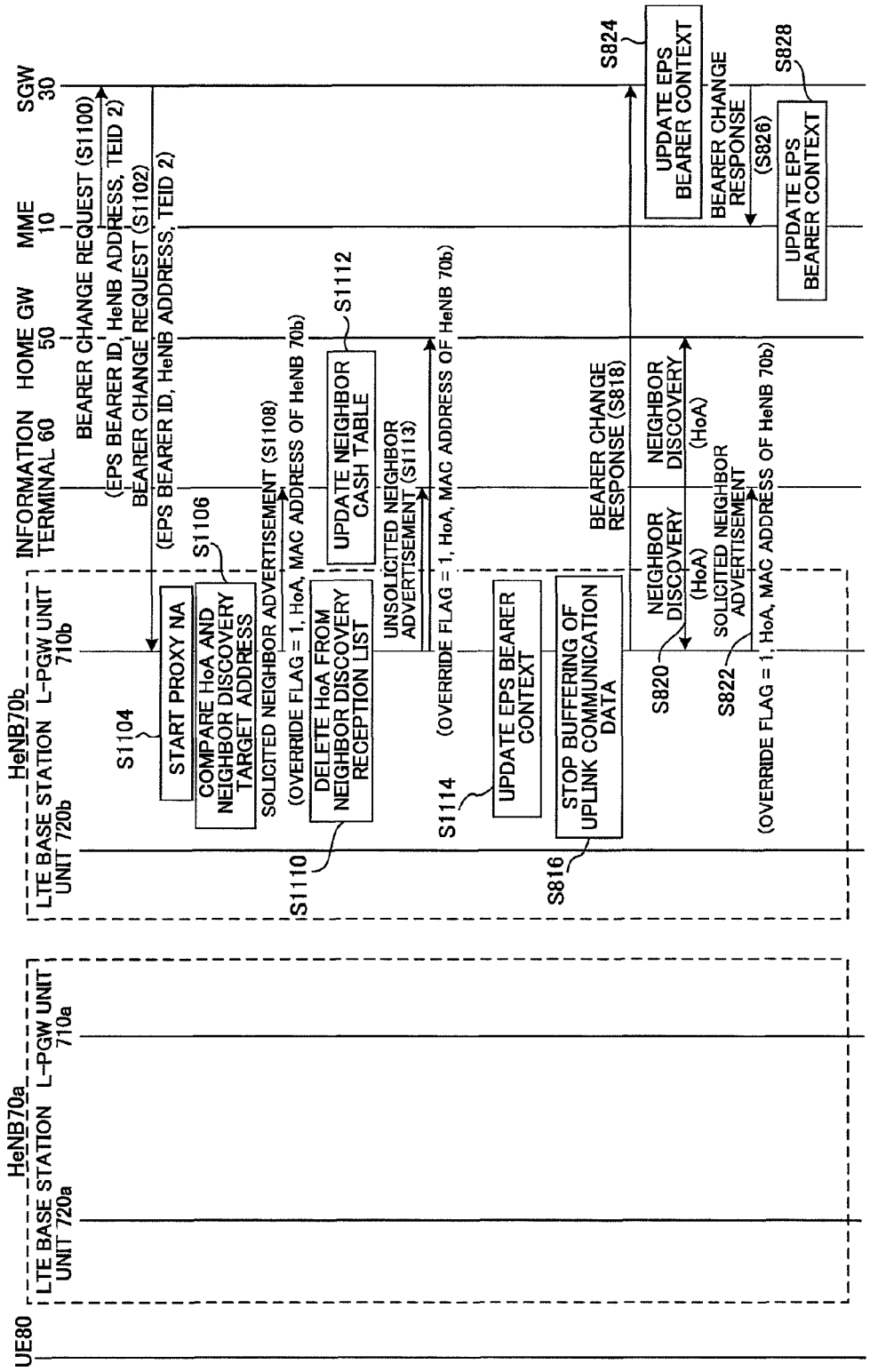
[FIG. 32] is a view showing an exemplary sequence of local PDN connection setting processing in the second embodiment.

FIG. 32 shows the local PDN connection setting processing in the present embodiment. Note that, same reference numerals are added to the same processing as the local PDN connection setting processing (FIG. 28) described in the first embodiment, and detailed description thereof will be omitted.

First, similarly to the local PDN connection setting processing in the first embodiment, the MME 10 transmits a bearer change request to the SGW 30 (S1100).

The SGW 30 receives the bearer change request and transmits the bearer change request to the L-PGW unit 710b (S1102). Note that, the MME 10 transmits the bearer change request to the L-PGW unit 710b through the SGW 30 once in the present embodiment, but may transmit to the L-PGW unit 710b directly.

The L-PGW unit 710b receives the bearer change request and starts Proxy NA processing (S1104). Here, differently from the first embodiment, the L-PGW unit 710b firstly compares the HoA that is stored as the neighbor discovery target address in the neighbor discovery reception list 762b at S1006 and the HoA performing the Proxy NA processing acquired in the local PDN connection rearrangement processing (S1106), and when both are matched, uses the transmitting source IP address and the transmitting source MAC address of neighbor discovery stored in the neighbor discovery reception list 762b to transmit Solicited neighbor advertisement to be addressed to the information terminal (S1108), and deletes the entry of these HoAs from the neighbor discovery reception list 762b

(S1110). The neighbor advertisement includes the HoA and the MAC address (that is, "00:1E:11:22:33:33") of the HeNB 72*b*.

In accordance with the received Solicited neighbor advertisement, the information terminal 60 updates the neighbor cash table 652 into FIG. 15(*b*) (S1112) and becomes in the state where transmission of communication data addressed to the UE 80 is possible.

Further, similarly to the first embodiment, the L-PGW unit 710*b* transmits Unsolicited neighbor advertisement into the home network 5 (S1113). In addition, when the neighbor discovery including the HoA is received, it is set so as to return neighbor advertisement including the MAC address of the HeNB 72*b*.

The L-PGW unit 710*b* updates the EPS bearer context 754*b* as shown in FIG. 11(*c*) (S1114), and when the L-PGW unit 710*b* receives communication data addressed to the UE 80, it is set so as to be transferred to the LTE base station unit 720*b*.

Note that, even when the loop-back address is set as the address of the HeNB 72*b*, the L-PGW unit 710*b* is set so as to transfer the received communication data with itself as the LTE base station unit 720*b*, so that the operation becomes similar.

Since subsequent processing (S816 to S828) are similar to those of the first embodiment of the local PDN connection setting processing, description thereof will be omitted.

Note that, after the L-PGW unit 710*b* stores the HoA subjected to inquiry as the neighbor discovery target address, the transmitting source IP address and the transmitting source MAC address of neighbor discovery in the neighbor discovery reception list 762*b* at S1006, when the bearer change request to start the Proxy NA processing as to this HoA has not been received yet after the existence time has elapsed, it is judged that this HoA is not an IP address assigned to the UE managed by the L-PGW unit 710, and the entry about this HoA is deleted from the neighbor discovery reception list.

With the above, the service request processing is completed, and user data transmission/reception processing is started. Note that, since the user data transmission/reception processing is similar to that of the above-described first embodiment, description thereof will be omitted.

In this manner, in the present embodiment, the switching destination L-PGW stores the HoA that is included as a target address for neighbor discovery and the transmitting source IP address and the transmitting source MAC address of this neighbor discovery, and in the local PDN connection setting processing, performs transmission of Solicited neighbor advertisement as a response to this neighbor discovery using the above-described HoA and transmitting source addresses that are stored.

In the above-described first embodiment, in the local PDN connection setting processing, the information terminal 60 receives not the Solicited neighbor advertisement but the Unsolicited neighbor advertisement as a response to the neighbor discovery transmitted at S608 (S806), so that the neighbor discovery is to be transmitted again in accordance with the specification of RFC4861 and additional delay is caused until the neighbor cash table 652 of the information terminal 60 is updated.

However, in the present embodiment, since the HeNB 72 is provided with the neighbor discovery reception list 762, the information terminal 60 is able to transmit the Solicited neighbor advertisement as a response to the neighbor discovery transmitted at S608 (S1110), and the neighbor cash table 652 of the information terminal is updated instantly. This makes it possible to reduce time until transmission of communication data addressed to the UE 80 by the information terminal 60 is started.

[3. Third Embodiment]

Subsequently, description will be given for a third embodiment to which the present invention is applied. In the present embodiment, since a network configuration and an apparatus configuration are similar to those of the above-described first embodiment, detailed description thereof will be omitted.

[3.1 Description of Processing]

Description will be given for processing in the third embodiment. First, similarly to the first embodiment, the UE 80 performs attachment processing and local PDN connection establishment processing. Since this attachment processing and this local PDN connection establishment processing are similar to those of the first embodiment, description thereof will be omitted.

Next, description will be given below in detail for the procedure when the UE 80 carries out handover to the HeNB 70*b* while performing transmission/reception of communication data using local IP access.

[3.1.1 Handover Processing]

Figure 33:
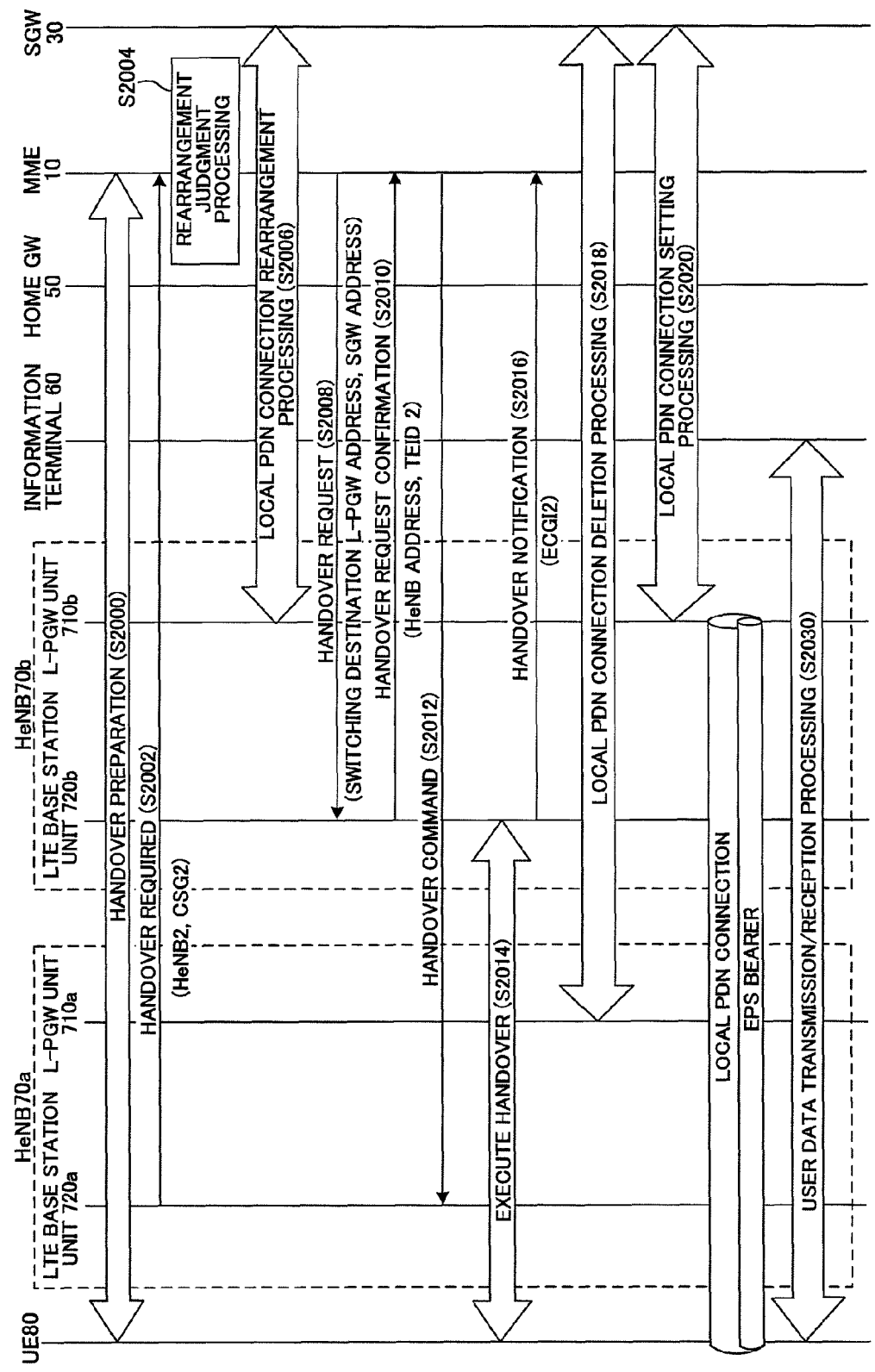
[FIG. 33] is a view showing an exemplary sequence of handover processing in a third embodiment.

Description will be given in detail for handover processing of the UE 80 in the present embodiment with FIG. 33.

First, in accordance with the handover procedure between base stations described in above-described Non-Patent Document 1, the UE 80 performs processing of handover preparation with the HeNB 70*a* serving as a moving source base station (S2000). Specifically, the UE 80 transmits a list of cells formed by the surrounding HeNB 70 and an eNB, and radio wave strength of each cell to the HeNB 70*a*, and the HeNB 70*a* determines a cell serving as a candidate of a moving destination based on the radio wave strength and the like.

The HeNB 70*a* determines the HeNB 70*b* serving as a handover destination, and transmits handover Required to the MME 10 (S2002). The handover Required includes a global eNB identifier of the HeNB 70*b* ("HENB 2") and a CSG identifier ("CSG 2").

Differently from the conventional one, the MME 10 executes rearrangement judgment processing for judging whether or not to perform local PDN connection rearrangement processing with the handover between the base stations of the UE 80 by referring to the EPS bearer context 126 (S2004).

Note that, since this rearrangement judgment processing is similar to that of the first embodiment, description thereof will be omitted.

As a result of the above-described judgment processing, when it is judged that local PDN connection rearrangement needs to be performed, the local PDN connection rearrangement processing is performed (S2006). Note that, since this processing is the same as the local PDN connection rearrangement processing of the first embodiment, description thereof will be omitted.

Next, the MME 10 transmits a handover request to the LTE base station unit 720*b* of the moving destination HeNB 70*b* (S2008). The handover request includes a switching destination L-PGW address and an SGW address stored in the rejudgment processing.

Note that, in the above-described registration processing of the HeNB 70, the cell ID and the HeNB 70*b* address are stored to be correspond to each other, and the MME 10 solves the corresponding HeNB 70*b* address using the cell ID of the HeNB 70*b* included in the handover Required received at S2002 to regard as a transmitting destination of the handover request.

In addition, when the above-described solved IP address of the HeNB 70*b* and the switching destination L-PGW address are matched, instead of including the switching destination L-PGW address in the handover request, a loop-back address (that is an IP address showing itself and "::1" in the case of the IPv6) may be included.

The LTE base station unit 720*b* performs pre-processing such as assignment of wireless resource of the UE 80, and transmits handover request confirmation to the MME 10 (S2010). The handover request confirmation includes the HeNB 70*b* address as the ENB address and a TEID 2 that is newly generated. Note that, here, when the loop-back address is included as the switching destination L-PGW address in the handover request, the loop-back address may be included similarly as the HeNB 70*b* address.

The MME 10 transmits a handover command to the LTE base station unit 720*a* of the HeNB 70*a* (S2012).

The LTE base station unit 720*a* instructs the UE 80 to execute handover and executes handover (S2014), and the UE 80 establishes a wireless bearer with the moving destination HeNB 70*b*.

Then, at timing when the wireless bearer is established with the UE 80, the LTE base station unit 720*b* of the HeNB 70*b* transmits handover notification to the MME 10 (S2016). The handover notification includes a cell ID of the HeNB 70*b* ("ECGI 2").

The MME 10 receives the handover notification, and the MME 10 performs local PDN connection deletion processing to delete the EPS bearer context 754*a* of the HeNB 70*a* before movement (S2018), and further performs local PDN connection setting processing to instruct the L-PGW unit 710*b* to start Proxy NA processing, with the completion of the establishment of the wireless bearer (S2020).

Note that, since the local PDN connection deletion processing and the local PDN connection setting processing are the same as the local PDN connection deletion processing and the local PDN connection setting processing described in the first embodiment, description thereof will be omitted.

With the above, the handover processing is completed. After that, communication data addressed to the UE 80 received from the home network 5 is to be transmitted to the HeNB 70*b*, and the UE 80 performs user data transmission/reception processing as shown in FIG. 22 while continuously using the IP address same as before handover (S2030). Note that, since the user data transmission/reception processing is similar to S400 to S422 described above, description thereof will be omitted.

In this manner, in the handover processing in the present embodiment, differently from the conventional handover processing, before the UE 80 starts the establishment of the wireless bearer with the moving destination HeNB, only local PDN connection rearrangement processing is performed as pre-processing for the switching destination L-PGW and the Proxy NA processing is not started. Then, after the wireless bearer is established, the local PDN connection deletion processing and the local PDN connection setting processing are performed and the switching destination L-PGW is instructed to start the Proxy NA processing.

The first embodiment and the second embodiment described above relate to switching of a connecting destination L-PGW in the idle mode mobility processing and the service request processing of the UE 80, and the present embodiment relates to the handover processing with the HeNB 70 of the UE 80.

However, it is common in terms of that Proxy NA processing is started by the switching destination L-PGW after the establishment of the wireless bearer, and it is after completion of the establishment of the wireless bearer that transmission of communication data addressed to the UE 80 from the information terminal 60 to the switching destination L-PGW is started, so that the switching destination L-PGW does not need to perform buffering of downlink communication data.

4. MODIFIED EXAMPLE

As described above, though the embodiments of the present invention have been described in detail with reference to the drawings, specific configurations are not limited to the embodiments and any design and the like in the scope without departing from the overview of the present invention are also included in the scope of claims.

Though description has been given in the present embodiment taking the case where the E-UTRA defined by the 3GPP is used as a wireless access technology as an example, without limitation thereto, the UTRA may be used as the wireless access technology.

Further, though description has been given in the present embodiment taking the case where the session establishment request, the session establishment response, the bearer change request and the bearer change response are used between the L-PGW unit 710 of the HeNB and the SGW 30 in the local PDN connection establishment processing as an example, without limitation thereto, instead, pursuant to the Proxy Mobile IPv6 protocol defined by the IETF RFC5213, equivalent processing may be performed using a binding update request and a binding update response.

Further, description has been given in the present embodiment taking the case where the IPv6 is used as an example, without limitation thereto, the same is also applicable to the case where the IPv4 is used.

Further, in the present embodiment, as to the Proxy NA processing that is started at the L-PGW unit 710 in conjunction with the session establishment request and the bearer change request, in judging start thereof, it is judged depending on the state of the EPS bearer context 754 of the L-PGW unit 710, whether or not the HoA is included in the received session establishment request, and whether or not the L-PGW unit 710 has already started the Proxy NA processing, but in order to simplify this judgment of start, the MME 10 may give an instruction explicitly by including a Proxy NA Indication flag as a flag for instructing the L-PGW unit 710 to start the Proxy NA processing in the session establishment request and the bearer change request transmitted by the MME 10.

Figure 17:
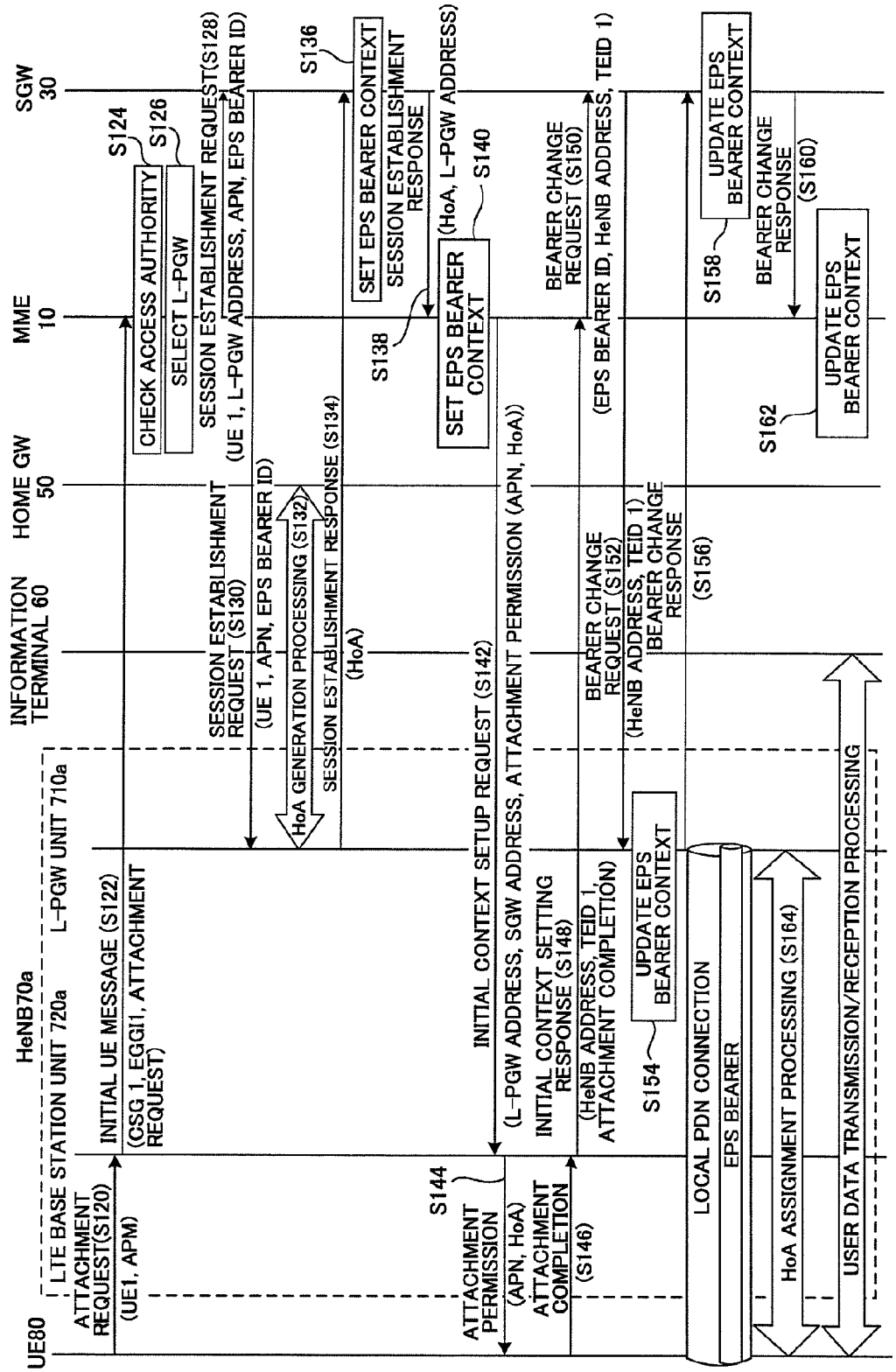
[FIG. 17] is a view showing an exemplary sequence of attachment processing of the UE to the HeNB in the first embodiment.
Figure 28:
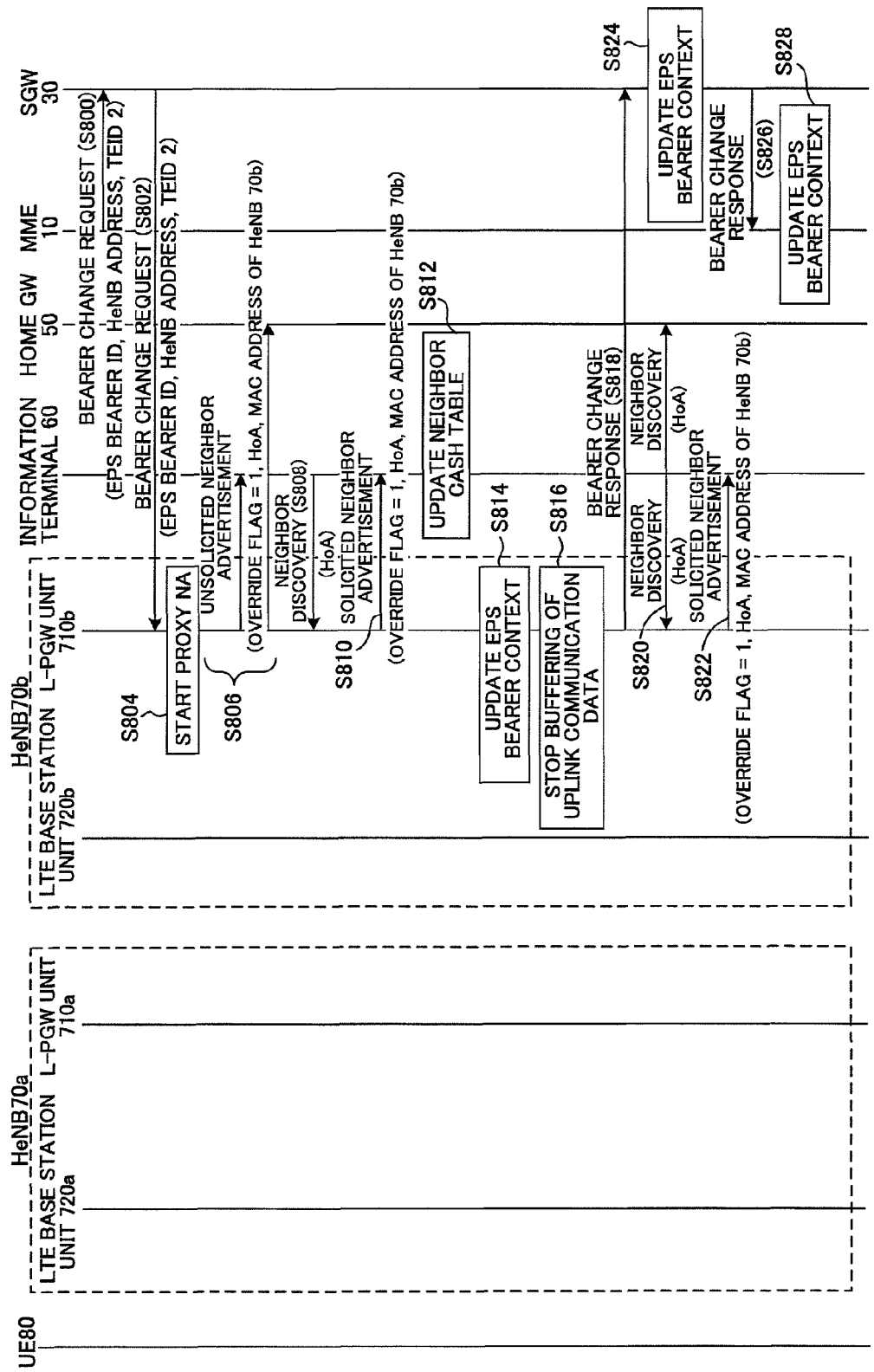
[FIG. 28] is a view showing an exemplary sequence of local PDN connection setting processing in the first embodiment.

More specifically, by including the Proxy NA Indication in S128 and S130 of FIG. 17, S800 and S802 of FIG. 28 and A1100 and S1102 of FIG. 32, start of the Proxy NA processing is explicitly requested.

Further, in the present embodiment, the L-PGW unit 710 judges that the UE 80 transits to the idle mode depending on that information about a base station to which the UE 80 is connected (the ENB address and the S1-TEID) is not set to the EPS bearer context 754, but without limitation thereto, the judgment may be performed by newly providing a flag that clarifies transition to the idle mode in the EPS bearer context 754.

Further, though description has been given in the present embodiment taking the case where the MME 10 stores the APN-IP address conversion DB 124 as an example, it may be configured such that like the DNS (Domain Name System), a database part is arranged in a core network as an independent apparatus, and when a corresponding PGW address is acquired using a global eNB identifier and an APN, the MME 10 inquires this data base apparatus.

Specifically, for example, such a method is considered that from the global eNB identifier ("HENB 1") and the APN ("LIPA"), an FQDN (Fully Qualified Domain Name) such as "HENB1. LIPA. EXAMPLE. COM" is generated, and using the generated FQDN, an IP address is acquired by referring to the DNS.

Further, though description has been given in the present embodiment taking the case where the MME 10 stores the subscription DB 122 as an example, without limitation thereto, the MME 10 may make inquiry to an external DB that manages user subscription information such as an HSS (Home Subscriber System), perform acquisition of the subscription information, and based on which, perform checking of an access authority.

Further, though description has been given in the present embodiment taking the case where the HeNB 70 is connected to the SGW 30 and the MME 10 through the GW 60 as an example, without limitation thereto, it may be configured such that the HeNB 70 is directly connected to the SGW 30 and the MME 10.

Further, though description has been given in the present embodiment taking the case where the MME 10 and the L-PGW are connected through the SGW 30 as an example, without limitation thereto, it may be configured such that the MME 10 and the L-PGW are connected not via the SGW 30.

Moreover, a program operating in each apparatus in each embodiment is a program that controls a CPU or the like (a program that causes a computer to function) so as to realize the functions of above-described embodiments. In addition, information handled in the apparatuses is temporarily accumulated in a temporal storage apparatus (for example, a RAM) when being processed, is then stored in various storage apparatuses of ROMs or HDDs, and is read out, amended, and written in by the CPU as necessary.

Here, a recording medium to store the program therein may be any one of a semiconductor medium (for example, ROM, nonvolatile memory card, or the like), an optical recording medium and an optical magnetic recording medium (for example, DVD (Digital Versatile Disc), MO ((Magneto Optical Disc), MD (Mini Disc), CD (Compact Disc), BD, or the like), and a magnetic recording medium (for example, magnetic tape, flexible disk, or the like), and the like. In addition, by executing the loaded program, not only the functions of the above-described embodiments are realized, but the functions of the present invention are realized by performing processing, based on an instruction of the program, in cooperation with an operating system or another application program and the like in some cases.

In addition, for market distribution, the program is able to be stored in a portable recording medium to be distributed or transferred to a server computer connected via a network such as the Internet. In this case, a storage apparatus of the server computer is also of course included in the present invention.

In addition, a part or all of each apparatus in the above-described embodiments may be realized as an LSI (Large Scale Integration) that is an integrated circuit typically. Each functional block of each apparatus may be individually made into a chip or a part or all of them may be integrally made into a chip. Moreover, a method for converting into an integrated circuit may be realized by a dedicated circuit or a versatile processor without limitation to the LSI. In addition, when a technique of converting into an integrated circuit substitute for the LSI appears with progress of the semiconductor technique, it is of course also able to use the integrated circuit by this technique.

DESCRIPTION OF REFERENCE NUMERALS 1 mobile communication system
3 core network
10 MME
100 control unit
110 transmission/reception unit
120 storage unit
122 subscription DB
124 APN-IP address conversion DB
126 EPS bearer context
20 GW
30 SGW
300 control unit
310 transmission/reception unit
320 packet transmission/reception unit
330 bearer establishment processing unit
350 storage unit
352 EPS bearer context
40 PGW
5 home network
50 home GW
60 information terminal
600 control unit
610 home network interface unit
650 storage unit
652 neighbor cash table
70, 72 HeNB
700 control unit
710 L-PGW unit
720 LTE base station unit
730 home network interface unit
750, 760 storage unit
752 IP address pool
754 EPS bearer context
756 neighbor cash table
762 neighbor discovery reception list
80 UE
800 control unit
810 LTE interface unit
820 packet transmission/reception unit
830 bearer establishment processing unit
850 storage unit

The invention claimed is:

1. A packet gateway apparatus in a home network comprising:
   a control unit configured to establish a local PDN (Packet Data Network) connection with a mobile station apparatus connected to a base station apparatus in the home network, the local PDN connection in which one or more EPS (Evolved Packet System) bearers being included; and
   a transmission/reception unit configured to receive a change request of the EPS bearer,
   the control unit stores an address of the mobile station apparatus,
   the transmission/reception unit, when the bearer change request is received, starts proxy transmission of neighbor advertisement toward an information terminal connected to the home network, instead of the mobile station apparatus using the address of the mobile station apparatus stored in the control unit.

2. The packet gateway apparatus according to claim 1, wherein
   the control unit carries out proxy response of the neighbor advertisement instead of the mobile station apparatus,
   the transmission/reception unit receives an idle mode shift notification of the mobile station apparatus transmitted by the position managing apparatus, the control unit stops the proxy response based on the reception of the idle mode shift notification.

3. The packet gateway apparatus according to claim 1, wherein
the control unit carries out proxy reception of neighbor discovery addressed to the mobile station apparatus,
the control unit stores a source address of the neighbor discovery and a discovery destination address included in the received neighbor discovery, wherein
the transmission/reception unit, when the address of the mobile station apparatus stored in the control unit and the discovery destination address are matched, starts proxy transmission of the neighbor advertisement to the source address stored in the control unit.

4. A mobile communication system comprising:
a home network in which a mobile station apparatus and a plurality of base station apparatuses including a base station apparatus having a packet gateway apparatus that establishes local PDN (Packet Data Network) connection with the mobile station apparatus are connected; and
a core network in which a position managing apparatus that manages a position of the mobile station apparatus and an access control apparatus that controls access of each apparatus are connected,
the home network and the core network are connected by an external network, wherein,
the position managing apparatus comprises:
an EPS (Evolved Packet System) bearer context that stores a first base station apparatus in which the mobile station apparatus establishes local PDN connection with a packet gateway apparatus of the first base station apparatus;
a message receiving unit receives a message including an identifier of a second base station apparatus serving as a connecting destination of the mobile station apparatus;
a local PDN connection rearranging unit requests rearrangement of local PDN connection to a packet gateway apparatus of the second base station apparatus, when the second base station apparatus included in the message received by the message receiving unit is different from the first base station apparatus stored in the EPS bearer context;
a PDN connection deleting unit deletes the local PDN connection of the mobile station apparatus and the first base station apparatus; and
a local PDN connection setting unit instructs the second base station apparatus to start proxy transmission of neighbor advertisement instead of the mobile station apparatus after establishment of a wireless bearer is completed between the mobile station apparatus and the second base station apparatus.

* * * * *